US012713387B2

(12) United States Patent
Li et al.

(10) Patent No.: US 12,713,387 B2
(45) Date of Patent: Aug. 18, 2026

(54) VEHICLE-ROAD COOPERATIVE POSITIONING METHOD AND ON-BOARD POSITIONING SYSTEM

(71) Applicant: CICT CONNECTED AND INTELLIGENT TECHNOLOGIES CO., LTD., Chongqing (CN)

(72) Inventors: Chenxin Li, Chongqing (CN); Jinling Hu, Chongqing (CN); Rui Zhao, Chongqing (CN)

(73) Assignee: CICT CONNECTED AND INTELLIGENT TECHNOLOGIES CO., LTD., Chongqing (CN)

( * ) Notice: Subject to any disclaimer, the term of this patent is extended or adjusted under 35 U.S.C. 154(b) by 257 days.

(21) Appl. No.: 18/290,003

(22) PCT Filed: Apr. 18, 2022

(86) PCT No.: PCT/CN2022/087337
§ 371 (c)(1),
(2) Date: Nov. 8, 2023

(87) PCT Pub. No.: WO2022/237454
PCT Pub. Date: Nov. 17, 2022

(65) Prior Publication Data
US 2024/0259989 A1 Aug. 1, 2024

(30) Foreign Application Priority Data
May 8, 2021 (CN) ......................... 202110498145.9

(51) Int. Cl.
*H04W 64/00* (2009.01)
*G01S 5/02* (2010.01)

(52) U.S. Cl.
CPC ......... *H04W 64/003* (2013.01); *G01S 5/0284* (2013.01)

(58) Field of Classification Search
CPC ....... G01S 5/0244; H04W 4/46; H04W 4/023; H04W 4/44; H04W 64/00; H04W 24/08;
(Continued)

(56) References Cited

U.S. PATENT DOCUMENTS

2015/0263431 A1* 9/2015 Moon .................... H01Q 21/26 343/730
2019/0238658 A1* 8/2019 Shimizu .................. H04W 4/46
(Continued)

FOREIGN PATENT DOCUMENTS

CN 110632635 A 12/2019
CN 111343579 A 6/2020
(Continued)

OTHER PUBLICATIONS

The extended European search report of counterpart EP application No. 22806424.2, issued on Oct. 10, 2024.
(Continued)

*Primary Examiner* — Nimesh Patel
(74) *Attorney, Agent, or Firm* — The Sun IP Law

(57) ABSTRACT

Disclosed are a vehicle-road cooperative positioning method and an on-board positioning system, which relate to the technical field of Internet of vehicles. The method includes: receiving a first vehicle to everything (V2X) message sent by at least one road side unit (RSU), where the first V2X message carries location information of the RSU; determining first positioning information between a vehicle and the RSU based on a first parameter, where the first positioning information includes first distance information, or includes first distance information and first angle information, and the first parameter is determined by measuring a signal transmitted on a V2X sidelink; and determining a location of the vehicle according to the first positioning information and the location information of the RSU.

15 Claims, 8 Drawing Sheets

(58) Field of Classification Search

CPC ..... H04W 8/005; H04W 48/16; H04W 92/18; H04W 48/12; H04W 88/04; H04W 40/12; H04W 40/22; H04W 40/24; H04W 76/14; H04W 72/02; H04W 52/0229; H04W 52/0245; H04W 72/54; H04W 28/0268; H04W 72/20; H04W 28/0236; H04W 28/0967; H04W 48/10; H04W 84/042; H04W 72/04; H04W 36/302; H04W 56/002; H04W 72/563; H04W 76/10; H04W 36/18; H04W 36/00833; H04W 36/144; H04W 36/03; H04W 72/00; H04W 88/14; H04B 17/328; H04B 7/0695; H04B 7/0452; H04B 7/0626; H04B 7/0617; H04B 17/318; H04B 17/336; H04B 7/06954; H04B 17/327; H04B 7/15507; H04B 17/382; H04B 17/346; H04B 17/3913; H04L 5/0048; H04L 5/0007; H04L 2001/0097; H04L 41/0803; H04L 43/08; H04L 5/006; H04L 5/0037; Y02D 30/70; H04J 11/0079; H04J 11/0056; H04J 11/0026; H04J 11/00; H04J 11/0059; H04J 11/0069; H04J 11/0023; H04J 2011/0096

See application file for complete search history.

(56) References Cited

U.S. PATENT DOCUMENTS

| | | | | |
|---|---|---|---|---|
| 2019/0302220 | A1* | 10/2019 | Kumar | H04W 4/44 |
| 2021/0099831 | A1* | 4/2021 | Gong | G08G 1/0962 |
| 2023/0076030 | A1* | 3/2023 | Baek | H04W 64/006 |

FOREIGN PATENT DOCUMENTS

| | | | |
|---|---|---|---|
| CN | 112567673 | A | 3/2021 |
| CN | 112583553 | A | 3/2021 |
| CN | 112585425 | A | 3/2021 |
| CN | 112995899 | A | 6/2021 |
| CN | 114095520 | A | 2/2022 |
| KR | 10-2021-0029267 | A | 3/2021 |
| WO | 2020016150 | A1 | 1/2020 |
| WO | 2020031541 | A1 | 2/2020 |
| WO | 2021080376 | A1 | 4/2021 |

OTHER PUBLICATIONS

Notice of Refusal of counterpart JP Application No. 2023-568703 issued Nov. 5, 2024.

The first Office Action of counterpart KR application No. 10-2023-7042420, issued on Apr. 29, 2026.

* cited by examiner

Fig. 7

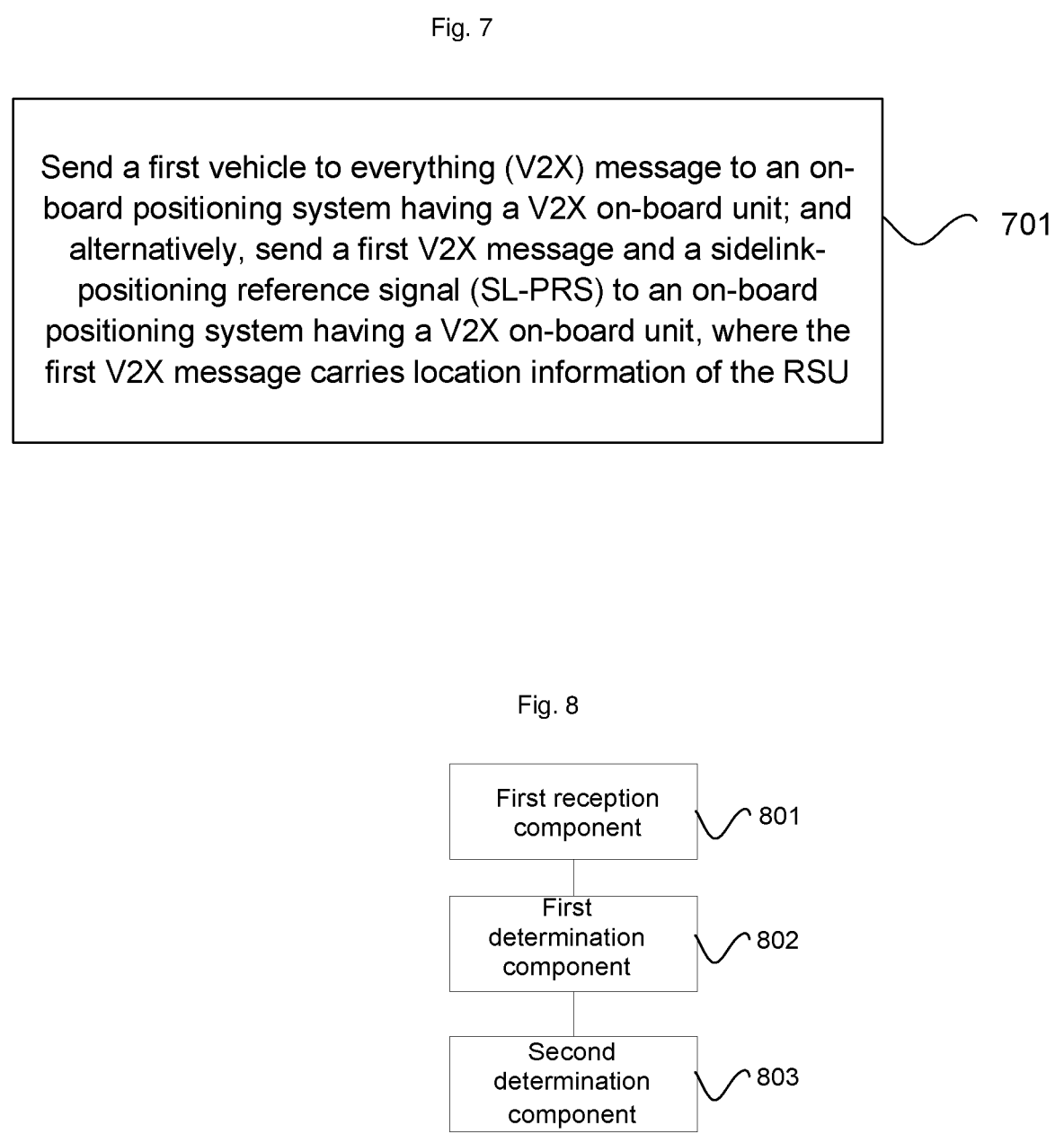

Send a first vehicle to everything (V2X) message to an on-board positioning system having a V2X on-board unit; and alternatively, send a first V2X message and a sidelink-positioning reference signal (SL-PRS) to an on-board positioning system having a V2X on-board unit, where the first V2X message carries location information of the RSU

First reception component

801

First determination component

802

Second determination component

803

VEHICLE-ROAD COOPERATIVE POSITIONING METHOD AND ON-BOARD POSITIONING SYSTEM

TECHNICAL FIELD

The disclosure relates to the technical field of Internet of vehicles, and in particular to a vehicle-road cooperative positioning method and apparatus, an on-board positioning system and a road side unit.

BACKGROUND

A variety of vehicle-road cooperative/Internet of vehicle positioning ways have been available. A global navigation satellite system (GNSS)/GNSS real-time kinematic (RTK) technology can achieve high positioning accuracy in the case of GNSS signal coverage, but cannot achieve positioning or cannot support high-accuracy positioning in the case of no GNSS coverage or poor GNSS signal coverage (such as tunnels, underground transportation channels, underground coal mines and urban pipe galleries). In this case, it is necessary to use other positioning ways to support vehicle-road cooperation. However, as for other positioning ways:

in an inertial measurement unit (IMU) assisted positioning way and/or sensor (such as cameras, laser radars and millimeter-wave radars) based positioning way, if high-accuracy positioning is required, it is generally necessary to collect a high-definition map in advance. High-accuracy positioning can be achieved only by means of detection of feature points and matching between the feature points and the high-definition map. However, for a vehicle-road cooperative application, a high-accuracy map is required to achieve high coverage in country.

SUMMARY

In a first aspect, an Embodiment of the disclosure provides a vehicle-road cooperative positioning method. The method is applied to an on-board positioning system, and includes:

a first vehicle to everything (V2X) message sent by at least one RSU is received, where the first V2X message carries location information of the RSU;

first positioning information between a vehicle and the RSU is determined based on a first parameter, where the first positioning information includes first distance information, or includes first distance information and first angle information, and the first parameter is determined by measuring a signal transmitted on a V2X sidelink; and a location of the vehicle is determined according to the first positioning information and the location information of the RSU.

Alternatively, the step that a location of the vehicle is determined according to the first positioning information and the location information of the RSU includes:

the location of the vehicle is determined according to second positioning information between the vehicle and the at least one RSU detected by a detection sensor, the location information of the RSU, and the first positioning information, where the second positioning information includes second distance information, or includes second distance information and second angle information.

Alternatively, the method further includes:

detection data from the detection sensor is obtained; and validity of the detection data is determined; and the step that the location of the vehicle is determined according to second positioning information between the vehicle and the at least one RSU detected by a detection sensor, the location information of the RSU, and the first positioning information includes:

the location of the vehicle is determined according to the second positioning information between the vehicle and the at least one RSU detected by the detection sensor, the location information of the RSU, and the first positioning information under the condition of determining that the detection data is valid.

Alternatively, the first parameter includes at least one of:

a first measurement parameter, where the first measurement parameter is reference signal received power (RSRP) measured based on a demodulation reference signal (DMRS) of a physical sidelink control channel (PSCCH), or is RSRP measured based on a DMRS of a physical sidelink shared channel (PSSCH);

a second measurement parameter, where the second measurement parameter is time of arrival (TOA) or a time difference of arrival (TDOA) based on the PSCCH, or is TOA or a TDOA based on the PSSCH;

a third measurement parameter, where the third measurement parameter is RSRP measured based on a sidelink-positioning reference signal (SL-PRS) sent by the RSU; and a fourth measurement parameter, where the fourth measurement parameter is at least one of signal transmission time, a signal transmission time difference, and a signal transmission angle parameter measured based on the SL-PRS.

Alternatively, the step that first positioning information between a vehicle and the RSU is determined based on a first parameter further includes:

first indication information in the first positioning information is determined based on the first parameter, where the first indication information is to indicate a type or confidence of the first distance information.

Alternatively, the step that first indication information in the first positioning information is determined based on the first parameter includes:

it is determined that the first indication information indicates that the type of the first distance information is an inaccurate measurement type under the condition that the first parameter is the first measurement parameter or the third measurement parameter;

it is determined that the first indication information indicates that the type of the first distance information is an inaccurate measurement type, or that the first indication information indicates that the confidence of the first distance information is preset confidence under the condition that the first parameter is the second measurement parameter; and it is determined that the first indication information indicates that the confidence of the first distance information is estimated confidence, or that the first indication information is to indicate that the type of the first distance information is an accurate measurement type under the condition that the first parameter is the fourth measurement parameter.

Alternatively, the step that a location of the vehicle is determined according to the first positioning information and the location information of the RSU includes:

the location of the vehicle is determined according to second positioning information between the vehicle and the at least one RSU detected by the detection sensor, the location information of the RSU and the first positioning information under the condition that the type of the first distance information indicated by the first indication information is an inaccurate measurement type, the confidence of the first distance information indicated by the first indication information is greater than or equal to a confidence threshold, or the confidence of the first distance information indicated by the first indication information is greater than distance measurement accuracy of a detection sensor, where the second positioning information includes second distance information, or includes second distance information and second angle information;

the location of the vehicle is determined according to the first positioning information and the location information of the RSU under the condition that the confidence of the first distance information indicated by the first indication information is less than or equal to distance measurement accuracy of a detection sensor, or the type of the first distance information indicated by the first indication information is an accurate measurement type.

Alternatively, the method further includes:

detection data from the detection sensor is obtained; and validity of the detection data is determined; and the step that the location of the vehicle is determined according to second positioning information between the vehicle and the at least one RSU detected by a detection sensor, the location information of the RSU, and the first positioning information includes:

the location of the vehicle is determined according to the second positioning information between the vehicle and the at least one RSU detected by the detection sensor, the location information of the RSU, and the first positioning information under the condition of determining that the detection data is valid.

Alternatively, the step that validity of the detection data is determined includes:

under the condition that the number of sampling points occupied by the at least one RSU detected by the detection sensor is greater than or equal to a first preset value, or a proportion of the number of sampling points occupied by the at least one RSU detected by the detection sensor in the total number of sampling points is greater than or equal to a second preset value, it is determined that the detection data is valid.

Alternatively, the step that validity of the detection data is determined includes:

distance measurement accuracy of each of the RSUs detected by the detection sensor is determined according to the number of sampling points occupied by each of the RSUs detected by the detection sensor, or a proportion of the number of sampling points occupied by each of the RSUs in the total number of sampling points; and it is determined that the detection data is valid under the condition that at least one of distance measurement accuracy of the RSUs detected by the detection sensor is less than the confidence of the first distance information indicated by the first indication information.

Alternatively, the step that the location of the vehicle is determined according to second positioning information between the vehicle and the at least one RSU detected by a detection sensor, the location information of the RSU, and the first positioning information includes:

an RSU sending the first V2X message is matched with an RSU detected by the detection sensor according to the first positioning information and the second positioning information, and matched location information of the RSU detected by the detection sensor is determined;

the location of the vehicle is determined according to the matched location information of the RSU detected by the detection sensor and the second distance information in the second positioning information between the vehicle and the RSU detected by the detection sensor; and alternatively, the location of the vehicle is determined according to the matched location information of the RSU detected by the detection sensor, and the second distance information and the second angle information in the second positioning information between the vehicle and the RSU detected by the detection sensor.

Alternatively, the step that an RSU sending the first V2X message is matched with an RSU detected by the detection sensor according to the first positioning information and the second positioning information, and matched location information of the RSU detected by the detection sensor is determined includes:

for the at least one RSU sending the first V2X message, according to historical location information of the vehicle and the location information of each of the RSUs, the RSU(s) which the vehicle has passed through, and/or the RSU(s) which the vehicle has not passed through, where the RSU which the vehicle has passed through is determined as an RSU located at the rear of the vehicle, and the RSU which the vehicle has not passed through is determined as an RSU located in front of the vehicle;

for the at least one RSU sending the first V2X message, the RSU(s) located at a rear of the vehicle, and/or the RSU(s) located in front of the vehicle is determined;

a distance value in the first distance information corresponding to the RSU located at the rear of the vehicle and a distance value in the second distance information corresponding to the RSU located at the rear of the vehicle are marked as negative values, and a distance value in the first distance information corresponding to the RSU located in front of the vehicle and a distance value in the second distance information corresponding to the RSU located in front of the vehicle are marked as positive values;

from large distance values to small distance values, the RSU corresponding to the second distance information having the distance value being a negative value is matched with the RSU corresponding to the first distance information having the distance value being a negative value one by one; and from small distance values to large distance values, the RSU corresponding to the second distance information having the distance value being a positive value is matched with the RSU corresponding to the first distance information having the distance value being a positive value one by one.

Alternatively, the step that the location of the vehicle is determined according to second positioning information between the vehicle and the at least one RSU detected by a detection sensor, the location information of the RSU, and the first positioning information includes:

the RSU(s) located on a left side of a road, and/or the RSU(s) located on a right side of the road is determined, where the road is a road in which the vehicle is located;

the RSU(s) detected by the detection sensor located on the left side of the road, and/or the RSU(s) detected by the detection sensor located on the right side of the road is determined;

the RSU located on the left side of the road and corresponding to the first distance information is matched with the RSU located on the left side of the road and corresponding to the second distance information one by one, and the RSU located on the right side of the road and corresponding to the first distance information is matched with the RSU located on the right side of the road and corresponding to the second distance information one by one, and the matched location information of the RSU detected by the detection sensor is determined;

the location of the vehicle is determined according to the matched location information of the RSU detected by the detection sensor and the second distance information in the second positioning information between the vehicle and the RSU detected by the detection sensor; and alternatively, the location of the vehicle is determined according to the matched location information of the RSU detected by the detection sensor, and the second distance information and the second angle information in the second positioning information between the vehicle and the RSU detected by the detection sensor.

Alternatively, the step that the location of the vehicle is determined according to second positioning information between the vehicle and the at least one RSU detected by a detection sensor, the location information of the RSU, and the first positioning information includes:

predicted location information of the vehicle is computed according to each of the first positioning information;

relative location information between the vehicle and each of the RSUs is determined according to the predicted location information and the location information of each of the RSUs;

an RSU sending the first V2X message is matched with an RSU detected by the detection sensor according to the relative location information and each of the second positioning information, and matched location information of the RSU detected by the detection sensor is determined; and the location of the vehicle is determined according to the matched location information of the RSU detected by the detection sensor and the second positioning information.

Alternatively, the method further includes:

a second V2X message sent by each of the RSUs is received, where the second V2X message carries parameter information related to a surface of the RSU;

detection data detected by the detection sensor is obtained;

feature information in parameter information related to the surface of the RSU is obtained;

RSUs in the detection data are matched according to features indicated by the parameter information related to the surface of the RSU obtained from the second V2X message, and it is determined that the detection data includes the RSU under the condition of obtaining a matching result; and the second positioning information between the vehicle and the RSU is determined under the condition that the detection data includes the RSU, where under the condition that the second positioning information includes the second angle information, the second angle information is determined as an included angle between a first direction and a second direction, where the first direction is an extension direction of a connecting line between the detection sensor and the RSU detected by the detection sensor, and the second direction is a running direction of the vehicle or a lane line direction; and the surface of the RSU is provided with a reflecting material, or the surface of each of the RSUs is a metasurface or a smart metasurface, and the parameter information includes at least one of:

a supported signal type, a supported frequency band range, and a feature point shape.

Alternatively, the method further includes:

under the condition that at least one of the first positioning information is not obtained between two adjacent moments of determining the location of the vehicle or in a process of determining the location of the vehicle, the location of the vehicle is predicted based on at least one of: real-time filtering of measurement data of an inertial measurement unit, real-time filtering of a vehicle driving parameter, where the vehicle driving parameter includes at least one of a speed value, an acceleration value and an orientation angle value of the vehicle.

Alternatively, the method further includes:

under the condition that at least one of the first positioning information and at least one of the second positioning information are not obtained between two adjacent moments of determining the location of the vehicle or in a process of determining the location of the vehicle, the location of the vehicle is predicted based on at least one of: real-time filtering of measurement data of an inertial measurement unit, a vehicle driving parameter, where the vehicle driving parameter includes at least one of a speed value, an acceleration value and an orientation angle value of the vehicle.

In a second aspect, an Embodiment of the disclosure further provides a vehicle-road cooperative positioning method. The method is applied to an RSU, and includes:

a first V2X message is sent to an on-board positioning system having a V2X on-board unit; and alternatively, a first V2X message and an SL-PRS are sent to an on-board positioning system having a V2X on-board unit, where the first V2X message carries location information of the RSU.

Alternatively, a surface of the RSU is covered with a reflecting material, or is a metasurface or a smart metasurface.

Alternatively, the method further includes:

a second V2X message is sent to the on-board positioning system, where the second V2X message carries parameter information related to a surface of the RSU, and the parameter information includes at least one of:

a supported signal type, a supported frequency band range, and a feature point shape.

In a third aspect, an Embodiment of the disclosure further provides an on-board positioning system. The on-board positioning system includes: a transceiver, a memory, a processor and a computer program stored in the memory and running on the processor, where the processor implements the vehicle-road cooperative positioning method of the first aspect when executing the computer program.

In a fourth aspect, an Embodiment of the disclosure further provides an RSU. The RSU includes: a transceiver, a memory, a processor and a computer program stored in the memory and running on the processor, where the processor implements the vehicle-road cooperative positioning method of the second aspect when executing the computer program.

In a fifth aspect, an Embodiment of the disclosure further provides a vehicle-road cooperative positioning apparatus. The apparatus is applied to an on-board positioning system, and includes:

a first reception component configured to receive a first V2X message sent by at least one RSU, where the first V2X message carries location information of the RSU;

a first determination component configured to determine first positioning information between a vehicle and the RSU based on a first parameter, where the first positioning information includes first distance information, or includes first distance information and first angle information, and the first parameter is determined by measuring a signal transmitted on a V2X sidelink; and a second determination component configured to determine a location of the vehicle according to the first positioning information and the location information of the RSU.

In a sixth aspect, a embodiment of the disclosure further provides a vehicle-road cooperative positioning apparatus. The apparatus is applied to an RSU, and includes:

a first sending component configured to:

send a first V2X message to an on-board positioning system having a V2X on-board unit; and alternatively, send a first V2X message and an SL-PRS to an on-board positioning system having a V2X on-board unit, where the first V2X message carries location information of the RSU.

In a seventh aspect, a embodiment of the disclosure further provides a computer-readable storage medium. The computer-readable storage medium stores a computer program, where the computer program implements the vehicle-road cooperative positioning method of the first aspect, or the vehicle-road cooperative positioning method of the second aspect when executed by a processor.

BRIEF DESCRIPTION OF THE DRAWINGS

FIG. 7 is a second schematic flow chart of a vehicle-road cooperative positioning method according to a embodiment of the disclosure;

FIG. 8 is a first schematic structural diagram of a vehicle-road cooperative positioning apparatus according to a embodiment of the disclosure;

DETAILED DESCRIPTION OF THE EMBODIMENTS

Figure 1:
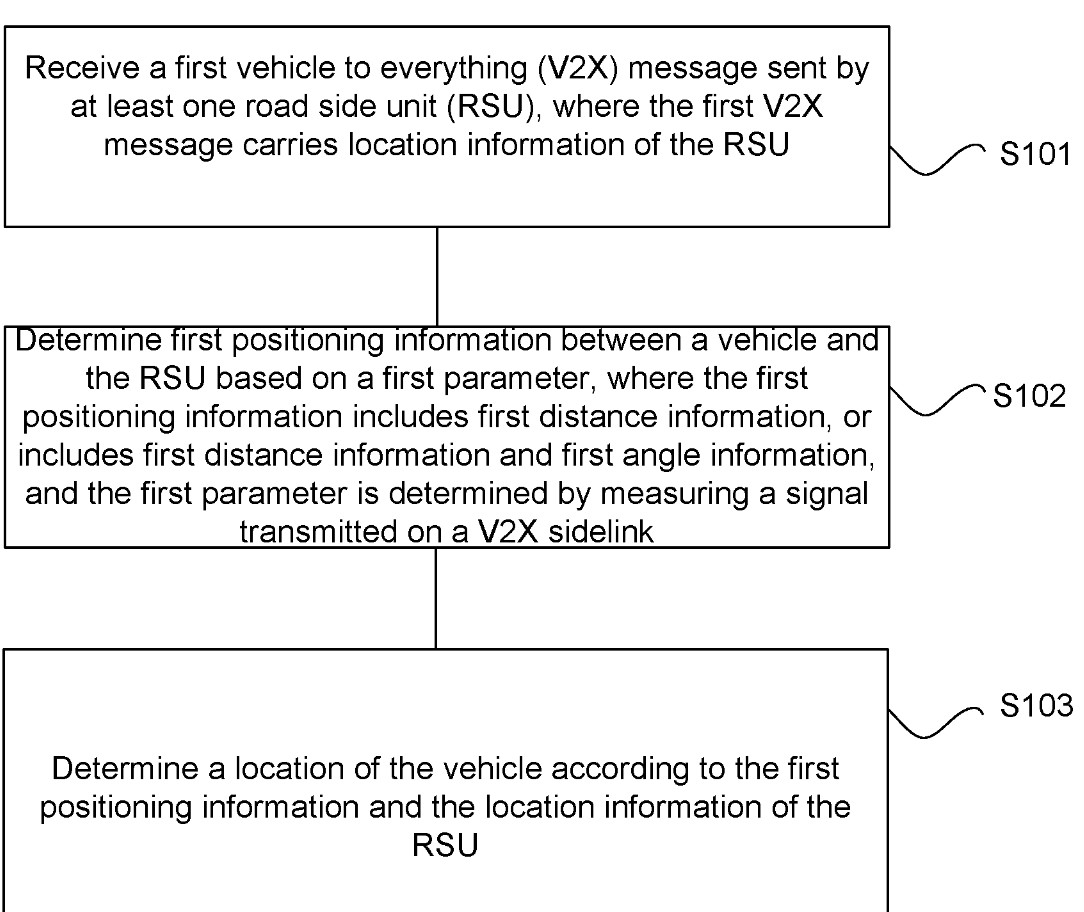
FIG. 1 is a first schematic flow chart of a vehicle-road cooperative positioning method according to a embodiment of the disclosure.

In order to make the technical problem to be solved, the technical solutions, and advantages of the disclosure clearer, the disclosure will be described in detail below with reference to the accompanying drawings and particular examples. In the following description, specific details such as specific configurations and components are provided merely to assist in a comprehensive understanding of the examples of the disclosure. Thus, those skilled in the art should make it clear that various changes and modifications can be made to the examples described herein without departing from the scope and spirit of the disclosure. In addition, descriptions of well-known functions and structures are omitted for clarity and conciseness.

It should be understood that "an example" or "one example" mentioned throughout the description means that particular features, structures, or characteristics related to the examples are included in at least one embodiment of the disclosure. Thus, "in an example" or "in one example" appearing in various places throughout the description does not necessarily refer to the same example. Furthermore, the particular features, structures, or characteristics can be combined in one or more examples in any suitable manner.

It should be understood that in various examples of the disclosure, the size of the sequence numbers of the processes above does not mean the sequence of execution, and the sequence of execution of the processes should be determined by the functions and inherent logics of the processes, and should not be construed as any limitations to the implementation of the examples of the disclosure.

In the examples provided in the disclosure, it should be understood that "B corresponding to A" means that B is associated with A, and B can be determined according to A. However, it should further be understood that determining B according to A does not mean that B is determined only according to A, and B can further be determined according to A and/or other information.

In the description of the examples of the disclosure, an on-board positioning system of a embodiment of the disclosure is explained.

The on-board positioning system is an on-board positioning system having a vehicle to everything (V2X) on-board unit (OBU); the on-board positioning system includes: the V2X OBU; and the on-board positioning system further includes: a detection sensor, an inertial measurement unit (IMU), and a positioning computation unit. The detection sensor can include, but not limited to, at least one of a camera, a laser radar, and a millimeter-wave radar; the V2X OBU is configured to communicate with a road side unit (RSU); the positioning computation unit is configured to position the vehicle according to data received by the V2X OBU and/or data detected by the detection sensor; and the IMU is configured to achieve assisted positioning. That is, the on-board positioning system is an on-board system that supports V2X communication, a perception sensor, and a positioning computation function.

Specifically, examples of the disclosure provide a vehicle-road cooperative positioning method and apparatus, an on-board positioning system and an RSU, which solve the following problems in the prior art: I. in a typical scenario having no global navigation satellite system (GNSS), such as a tunnel, low illumination can affect a detection effect of a camera, and the number of distinguishable feature points in the environment is limited, such that it is difficult to achieve effective accurate detection; II. an IMU has an accumulated error, and a high-definition positioning result can not be obtained for calibration in a certain period of time, the errors continues being accumulated, and high-definition positioning can not be supported; III. the prior art highly relies on a pre-collected high-definition map, and if the high-definition map is not pre-collected and covers a corresponding scenario, the detection sensor, the IMU, and fusion between the detection sensor and the IMU cannot support high-definition positioning; and IV. in a scenario having no GNSS, an operating bandwidth of a long term evolution (LET)-V2X sidelink is limited (which is, for example, currently 5905 MHz-5925 MHz in China), the PRIOR ART has no targeted positioning technology design, resulting in limited positioning accuracy. However, standardization research work for positioning of a new radio (NR) based sidelink has not yet started. Therefore, high-definition positioning (such as decimeter level and centimeter level) can not be supported currently.

As shown in FIG. 1, a embodiment of the disclosure provides a vehicle-road cooperative positioning method. The method includes:

Step 101, a first V2X message sent by at least one RSU is received, where the first V2X message carries location information of the RSU.

The step can specifically include: a V2X OBU receives the first V2X message sent by the RSU and sends the received first V2X message to a positioning computation element, and the positioning computation element parses the first V2X message to obtain the location information of the RSU carried in the first V2X message.

Step 102, first positioning information between a vehicle and the RSU is determined based on a first parameter, where the first positioning information includes first distance information, or includes first distance information and first angle information, and the first parameter is determined by measuring a signal transmitted on a V2X sidelink.

In the step, the signal transmitted on the V2X sidelink can be a signal transmitted on a physical sidelink shared channel (PSSCH) or a signal transmitted on a physical sidelink control channel (PSCCH), but is not limited to thereto.

Step 103, a location of the vehicle is determined according to the first positioning information and the location information of the RSU.

In the vehicle-road cooperative positioning method of the embodiment of the disclosure, the first V2X message sent by the at least one RSU is received, where the first V2X message carries the location information of the RSU; then the first positioning information between the vehicle and the RSU is determined based on the first parameter, where the first positioning information includes the first distance information, or includes the first distance information and the first angle information, and the first parameter is determined by measuring the signal transmitted on the V2X sidelink; and thus, determination accuracy in determining a distance and/or an angle between the vehicle and the RSU is improved, and the location of the vehicle is finally determined according to the first positioning information and the location information of the RSU. Finally, the on-board positioning system can accurately position the vehicle according to the V2X messages and a measurement result of the signal transmitted on the V2X sidelink without a GNSS and without dependence on a high-definition map.

As an alternative embodiment, step 103 that a location of the vehicle is determined according to the first positioning information and the location information of the RSU includes:

the location of the vehicle is determined according to second positioning information between the vehicle and the at least one RSU detected by a detection sensor, the location information of the RSU, and the first positioning information, where the second positioning information includes second distance information, or includes second distance information and second angle information.

That is, in the alternative embodiment, an on-board positioning system can determine the first positioning information of the RSU and the vehicle according to the first parameter, and can further directly determine, through the second positioning information between each of the RSUs and the vehicle detected by the detection sensor in the on-board positioning system, the location information of each of the RSUs detected by the detection sensor according to the first positioning information and the second positioning information, so as to determine the location of the vehicle according to the location information of each of the RSUs and the second positioning information between each of the RSUs and the vehicle. Since the second positioning information between each of the RSUs and the vehicle detected by the detection sensor is more accurate relative to the first position information between each of the RSUs and the vehicle determined according to the first parameter, the determination mode of the alternative embodiment further improves accuracy of positioning the vehicle relative to the mode of determining the location of the vehicle only according to the location information of each of the RSUs and the first positioning information.

As an alternative embodiment, under the condition of determining the location of the vehicle according to second positioning information between the vehicle and the at least one RSU detected by a detection sensor, the location information of the RSU, and the first positioning information, in order to further improve accuracy of positioning the vehicle, the vehicle-road cooperative positioning method further includes:

detection data from the detection sensor is obtained; and validity of the detection data is determined.

Specifically, the location of the vehicle is determined according to the second positioning information between the vehicle and the at least one RSU detected by the detection sensor, the location information of the RSU and the first positioning information under the condition of determining that the detection data is valid. Thus, the phenomenon of inaccurate vehicle positioning caused by determining the location of the vehicle through invalid detection data is avoided, and the accuracy of positioning the vehicle is further improved.

As an alternative embodiment, the first parameter includes at least one of:

a first measurement parameter, where the first measurement parameter is reference signal received power (RSRP) measured based on a demodulation reference signal (DMRS) of a PSCCH, or is RSRP measured based on a DMRS of a PSSCH;

a second measurement parameter, where the second measurement parameter is time of arrival (TOA) or a time difference of arrival (TDOA) based on the PSCCH, or is TOA or a TDOA based on the PSSCH; and a third measurement parameter, where the third measurement parameter is RSRP measured based on a sidelink-positioning reference signal (SL-PRS) sent by the RSU.

It should be noted herein that the SL-PRS and the first V2X message can be simultaneously sent. That is, the first V2X message includes the SL-PRS. The SL-PRS can also be sent separately.

a fourth measurement parameter, where the fourth measurement parameter is at least one of signal transmission time, a signal transmission time difference, and a signal transmission angle parameter measured based on the SL-PRS.

It should be noted herein that the signal transmission time measured based on the SL-PRS can be the TOA, round trip time (RTT), and symmetric bilateral two-way RTT of the SL-PRS; the signal transmission time difference measured based on the SL-PRS can be the TDOA and a reference signal time difference (RSTD) of the SL-PRS; and the signal transmission angle parameter measured based on the SL-PRS can be an angle of arrival (AOA) and an angle of departure (AOD) of a channel, but is not limited to thereto.

As an alternative embodiment, step 102 that first positioning information between a vehicle and the RSU is determined based on a first parameter further includes:

first indication information in the first positioning information is determined based on the first parameter, where the first indication information is to indicate a type or confidence of the first distance information.

That is, in the alternative embodiment, the first positioning information can include the first distance information and the first indication information, or can include the first distance information, the first angle information, and the first indication information. The first indication information is to indicate the type or confidence of the first distance information, so as to further determine parameters applied in a process of accurately positioning the vehicle according to content indicated by the first indication information, so as to further improve accuracy of positioning the vehicle. Subsequently, the process of positioning the vehicle will be classified and explained according to the content indicated by the first indication information.

In the alternative embodiment, the first indication information is configured such that the vehicle can be accurately positioned through the first positioning information when a measurement value (first distance information) of the V2X sidelink is superior to detection accuracy of the sensor. Otherwise, the vehicle is positioned through a distance measurement value (second positioning information) of the sensor in an effective detection range, so as to improve positioning accuracy.

As an alternative embodiment, the step that first indication information in the first positioning information is determined based on the first parameter includes:

it is determined that the first indication information indicates that the type of the first distance information is an inaccurate measurement type under the condition that the first parameter is the first measurement parameter or the third measurement parameter;

it is determined that the first indication information indicates that the type of the first distance information is an inaccurate measurement type, or that the first indication information is to indicate that the confidence of the first distance information is preset confidence under the condition that the first parameter is the second measurement parameter; and it is determined that the first indication information indicates that the confidence of the first distance information is estimated confidence, or that the first indication information is to indicate that the type of the first distance information is an accurate measurement type under the condition that the first parameter is the fourth measurement parameter.

It should be noted herein that the estimated confidence can be determined according to at least one of a bandwidth of the SL-PRS, the number of times of repeated sending of the SL-PRS, the number of the RSUs receiving the SL-PRS, a channel busy ratio (CBR), a channel environment, etc.

In the alternative embodiment, the content indicated by the first indication information is determined according to specific content of the first parameter. Thus, parameters applied for accurately positioning the vehicle can be determined according to the determination mode of the first parameter, and the vehicle is positioned through different positioning modes according to different first parameters, such that positioning accuracy is further improved without relying on a high-definition map.

As an alternative embodiment, under the condition that the first positioning information includes the first indication information, step 103 that a location of the vehicle is determined according to the first positioning information and the location information of the RSU includes:

the location of the vehicle is determined according to second positioning information between the vehicle and the at least one RSU detected by the detection sensor, the location information of the RSU and the first positioning information under the condition that the type of the first distance information indicated by the first indication information is an inaccurate measurement type, the confidence of the first distance information indicated by the first indication information is greater than or equal to a confidence threshold, or the confidence of the first distance information indicated by the first indication information is greater than distance measurement accuracy of a detection sensor, where the second positioning information includes second distance information, or includes second distance information and second angle information; and alternatively, the location of the vehicle is determined according to the first positioning information and the location information of the RSU under the condition that the confidence of the first distance information indicated by the first indication information is less than or equal to distance measurement accuracy of a detection sensor, or the type of the first distance information indicated by the first indication information is an accurate measurement type.

With reference to the relation between the first parameter and the content indicated by the first indication information, it can be seen that the situation that accuracy of the first distance information can not be high in the first parameter is determined through measurement of the existing signal transmitted on the V2X sidelink. However, if an exclusive positioning-related signal is used, for example, the SL-PRS sent by large bandwidth (such as 100 MHz or above spectrum) is used, accuracy of the first distance information can be high. In the alternative embodiment, the parameters used for positioning the vehicle can be further determined according to the accuracy of the first distance information such that the accuracy of positioning the vehicle can be further improved.

That is, in the alternative embodiment, since the first indication information can represent the accuracy of the first distance information, for example, if the first indication information indicates that the first distance information is an inaccurate measurement type, or the confidence of the first distance information is greater than the distance measurement accuracy of the detection sensor, it is represented that the accuracy of the first distance information is lower than that of the second distance information detected by the detection sensor. If the first indication information indicates that the first distance information is an accurate measurement type or the confidence of the first distance information is less than or equal to detection accuracy of the detection sensor, it is represented that the accuracy of the first distance information is equivalent to that of the second distance information detected by the detection sensor, or the accuracy of the first distance information is superior to that of the second distance information detected by the detection sensor. Thus, the vehicle is positioned according to positioning information having high accuracy in the first positioning information and the second positioning information, thereby further improving positioning accuracy.

As an alternative embodiment, under the condition that the first positioning information includes the first indication information, and it needs to be determined according to the first indication information that the location of the vehicle is determined according to the second positioning information between the vehicle and the at least one RSU detected by the detection sensor, the location information of the RSU, and the first positioning information, in order to further improve the accuracy of positioning the vehicle, the vehicle-road cooperative positioning method further includes:

- detection data from the detection sensor is obtained; and validity of the detection data is determined.

Specifically, the location information of the RSU, and the first positioning information under the condition of determining that the detection data is valid, the location of the vehicle is determined according to the second positioning information between the vehicle and the at least one RSU detected by the detection sensor. Thus, the phenomenon of inaccurate vehicle positioning caused by determining the location of the vehicle through invalid detection data is avoided, and the accuracy of positioning the vehicle is further improved.

The steps that validity of the detection data is determined in the above two embodiments are described in detail below.

As a particular example, the step that validity of the detection data is determined includes:

- under the condition that the number of sampling points occupied by the at least one RSU detected by the detection sensor is greater than or equal to a first preset value, or a proportion of the number of sampling points occupied by the at least one RSU detected by the detection sensor in the total number of sampling points is greater than or equal to a second preset value, it is determined that the detection data is valid.

That is, in the particular example, the validity of the detection data can be determined according to the number of the sampling points occupied by the RSU, or the proportion of the number of the sampling points occupied by the RSU in the total number of the sampling points. As long as the validity of one RSU is determined, the validity of the detection data is determined.

In the particular embodiment, the validity of the detection data can be determined according to the following steps:

- Step 1, whether the detection data includes sampling points of at least one RSU is determined; and
- Step 2, for each of the RSUs detected in the detection data, under the condition that the number of sampling points occupied by a single RSU detected is greater than or equal to a first preset value, or a proportion of sampling points occupied by a single RSU detected in the total number of sampling points is greater than or equal to a second preset value, the validity of the detection data for the RSU is determined. That is, the RSU is in an effective detection range of the detection sensor. It should be noted herein that the farther a distance between the RSU and the vehicle is, the lower the detection accuracy is, and the fewer sampling points occupied by a single RSU detected is. The sampling points can be laser radar point cloud data sampling points or camera sampling points, but are not limited to thereto.

As another particular embodiment, under the condition that the first positioning information includes the first indication information; and the first indication information indicates the confidence of the first distance information, and it needs to be determined according to the first indication information that the location of the vehicle is determined according to the second positioning information between the vehicle and the at least one RSU detected by the detection sensor, the location information of the RSU, and the first positioning information, the step that validity of the detection data is determined includes:

- distance measurement accuracy of each of the RSUs detected by the detection sensor is determined according to the number of sampling points occupied by each of the RSUs detected by the detection sensor, or a proportion of the number of sampling points occupied by each of the RSUs in the total number of sampling points; and
- it is determined that the detection data is valid under the condition that at least one of distance measurement accuracy of the RSUs detected by the detection sensor is less than the confidence of the first distance information indicated by the first indication information.

That is, the distance measurement accuracy of each of the RSUs detected by the detection sensor can be compared with the confidence of the first distance information. As long as the distance measurement accuracy of one RSU is higher than the confidence of the first distance information, it is deemed that the detection data of the RSU is valid.

In the particular embodiment, the validity of the detection data can be determined according to the following steps: Step 1, whether the detection data includes sampling points of at least one RSU is determined; and Step 2, for each RSU detected in the detection data, distance measurement accuracy of the detection sensor detecting the RSU is derived according to the number of sampling points occupied by a single RSU detected or a proportion of the number of sampling points occupied by a single RSU detected in the total number of sampling points, and if the distance measurement accuracy is lower than confidence of the first distance information, it is deemed that the detection data of the RSU is invalid.

As an alternative embodiment, the step that the location of the vehicle is determined according to second positioning information between the vehicle and the at least one RSU detected by a detection sensor, the location information of the RSU, and the first positioning information includes:

an RSU sending the first V2X message is matched with an RSU detected by the detection sensor according to the first positioning information and the second positioning information, and matched location information of the RSU detected by the detection sensor is determined;

It should be noted herein that since the detection sensor can only detect the distance between an object (vehicle) in which the detection sensor is located and a detected object (RSU), or a distance and angle between two objects, it is necessary to further match the location information to each of the RSUs detected by the detection sensor according to the first positioning information, so as to obtain reference points required to determine the location of the vehicle, i.e. the location information of the RSU.

The location of the vehicle is determined according to the matched location information of the RSU detected by the detection sensor and the second distance information in the second positioning information between the vehicle and the RSU detected by the detection sensor; and alternatively, the location of the vehicle is determined according to the matched location information of the RSU detected by the detection sensor, and the second distance information and the second angle information in the second positioning information between the vehicle and the RSU detected by the detection sensor.

In the step, under the condition that the second positioning information only includes the second distance information, the location of the vehicle can be determined according to the matched location information of the RSU detected by the detection sensor and the second distance information; under the condition that the second positioning information includes the second distance information and the second angle information, the location of the vehicle can be determined according to the matched location information of the RSU detected by the detection sensor, the second distance information and the second angle information; and certainly, under the condition that the second positioning information includes the second distance information and the second angle information, the location of the vehicle can also be determined only according to the matched location information of the RSU detected by the detection sensor and the second distance information, which are not limited in the disclosure.

It should be noted herein that when the location of the vehicle is determined, the RSU currently matching the location information can be used as a positioning reference point for computing the location of the vehicle.

The particular embodiment of the process of matching the location information to RSU detected by the detection sensor will be described below.

As an alternative embodiment, the step that an RSU sending the first V2X message is matched with an RSU detected by the detection sensor according to the first positioning information and the second positioning information, and matched location information of the RSU detected by the detection sensor is determined includes:

Step 1, according to historical location information of the vehicle and the location information of each of the RSUs, at least one of the following is determined from the at least one RSU sending the first V2X message: the RSU(s) which the vehicle has passed through, and/or the RSU(s) which the vehicle has not passed through, where the RSU which the vehicle has passed through is determined as an RSU located at the rear of the vehicle, and the RSU which the vehicle has not passed through is determined as an RSU located in front of the vehicle.

In the step, the historical location information can be the location information of the vehicle currently stored in the on-board positioning system. Under the condition that the detection sensor only detects one RSU, the RSU is determined as an RSU which the vehicle has passed through or an RSU which the vehicle has not passed through according to the historical location information and the location information of the RSU detected. Under the condition that the detection sensor detects two or more RSUs, the RSU can be determined as an RSU which the vehicle has passed through or an RSU which the vehicle has not passed through separately according to the historical location information.

Step 2, the RSU(s) located at the rear of the vehicle and/or the RSU(s) located in front of the vehicle is determined from the at least one RSU detected by the detection sensor.

Similarly, in the step, whether each of the RSUs detected by the detection sensor is located at the rear of the vehicle or in front of the vehicle is determined separately according to the relative location relation between each of the RSUs detected by the detection sensor and the vehicle, and a running direction of the vehicle.

Step 3, a distance value in the first distance information corresponding to the RSU located at the rear of the vehicle and a distance value in the second distance information corresponding to the RSU located at the rear of the vehicle are marked as negative values, and a distance value in the first distance information corresponding to the RSU located in front of the vehicle and a distance value in the second distance information corresponding to the RSU located in front of the vehicle are marked as positive values.

In the step, according to whether each of the RSUs determined is located at the rear of the vehicle or in front of the vehicle, the distance value in the first distance information and the second distance information between each of the RSUs and the vehicle are marked with "positive values or negative values" such that matching of RSUs closest to the vehicle starts subsequently when the location information matches each of the RSUs detected by the detection sensor.

Step 4, from large distance values to small distance values, the RSU corresponding to the second distance information having the distance value being a negative value is matched with the RSU corresponding to the first distance information having the distance value being a negative value one by one.

Step 5, from small distance values to large distance values, the RSU corresponding to the second distance information having the distance value being a positive value is matched with the RSU corresponding to the first distance information having the distance value being a positive value one by one.

In the particular embodiment, on one hand, the RSU sending the first V2X message is classified as an RSU which the vehicle has passed through (RSU located at the rear of the vehicle) and an RSU which the vehicle has not passed through (RSU located in front of the vehicle); the RSU detected by the detection sensor is also classified into an RSU located at the rear of the vehicle and an RSU located in front of the vehicle, thereby matching the location information to the RSU located at the rear of the vehicle and the RSU located in front of the vehicle separately, avoiding a matching error caused by inaccurate first distance information, and improving matching accuracy. On the other hand, the RSU located at the rear of the vehicle is matched one by one from the large distance values to the small distance values, and the RSU located in front of the vehicle is matched one by one from the small distance values to the large distance values, such that matching of locations starts from the RSU closest to the vehicle, thereby avoiding a matching error of the location of the RSU caused by inaccurate first distance information, and improving matching accuracy.

The implementation process of the above matching location information is described below with reference to particular examples.

Embodiment 1

Figure 2:
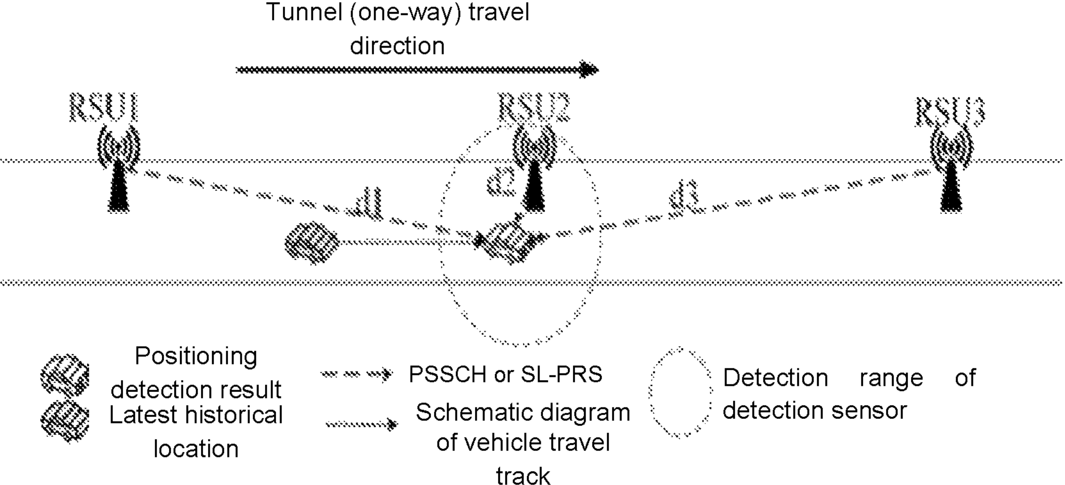
FIG. 2 is a schematic diagram of one road side unit (RSU) detected by a detection sensor according to a embodiment of the disclosure.
Figure 5:
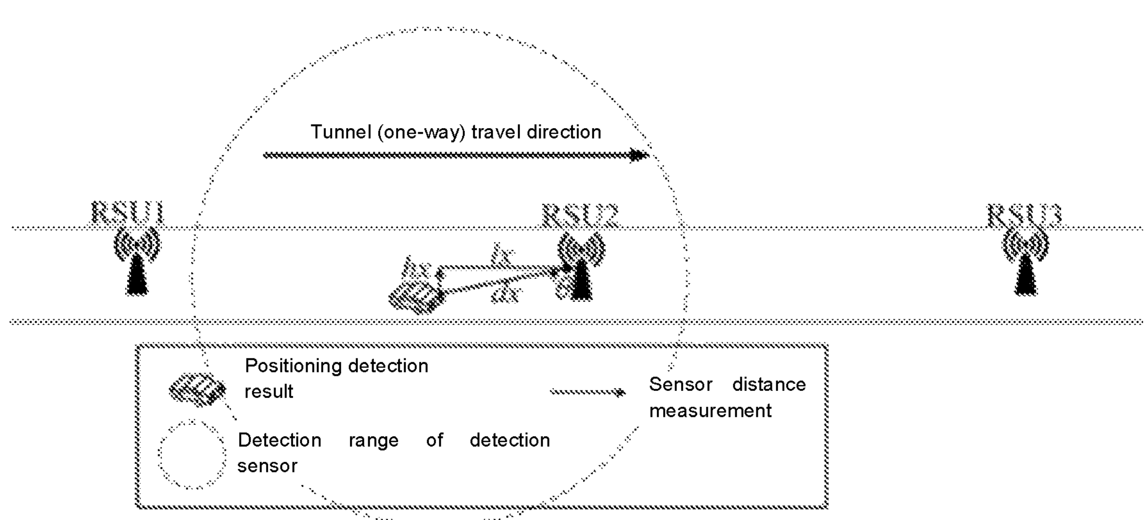
FIG. 5 is a schematic diagram of positioning a vehicle through one RSU according to a embodiment of the disclosure.

As shown in FIG. 2, a detection sensor detects an RSU (RSU2), the detection sensor detects second distance information between the RSU and a vehicle detected by the detection sensor as dx', and it is determined that the RSU is located in front of the vehicle. Therefore, the second distance information is marked as +dx'. Then, it is determined that a V2X OBU receives a first V2X message sent by three RSUs, and the three RSUs are an RSU1, an RSU2 and an RSU3 respectively, where first distance information corresponding to the RSU1 is d1, first distance information corresponding to the RSU2 is d2, and first distance information corresponding to the RSU3 is d3. It is determined that the vehicle has passed through the RSU1 and has not passed through the RSU2 and RSU3 according to historical location information of the vehicle. Therefore, the first distance information corresponding to the RSU1 is marked as −d1, the first distance information corresponding to the RSU2 is marked as +d2, and the first distance information corresponding to the RSU3 is marked as +d3. Through comparison, |d2|<|d1|<|d3| is determined. Then, since the detection sensor only detects one RSU which the vehicle has not passed through, only positive distance measurement values marked by the V2X OBU based on the first V2X message are sorted. A result is as follows: d2<d3. Finally, a positioning computation unit determines that the RSU detected by the detection sensor is the RSU2 according to the sorting result, and positions the vehicle according to location information of the RSU2 and second distance information dx' corresponding to the RSU2. A specific positioning process is as follows: as shown in FIG. 5, an included angle θ between a detection sensor and an RSU2 is determined by using a location of the RUS2 as a reference point based on a measurement result of a detection sensor and a running direction of a vehicle; then, a longitudinal coordinate and a horizontal coordinate of the detection sensor relative to the RSU2 are solved according to the included angle θ; and the location of the vehicle is solved based on the location coordinate of the RSU2.

Embodiment 2

Figure 3:
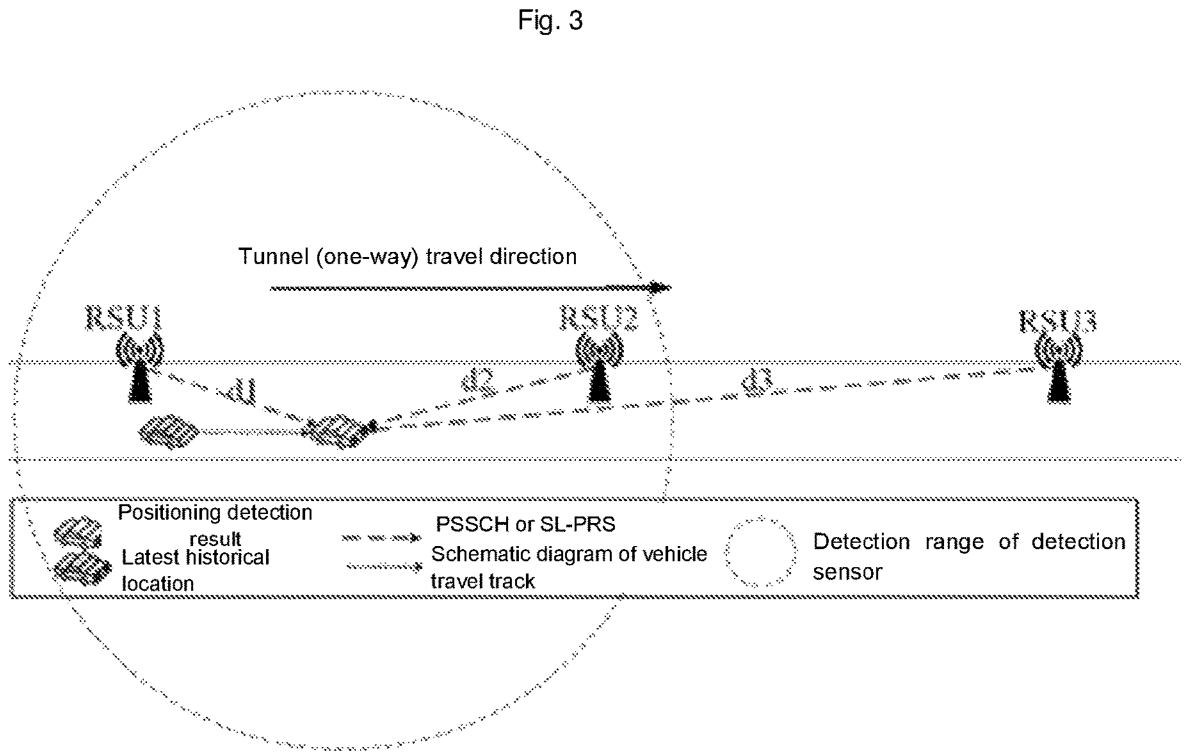
FIG. 3 is a schematic diagram of two RSUs detected by a detection sensor according to a embodiment of the disclosure.
Figure 6:
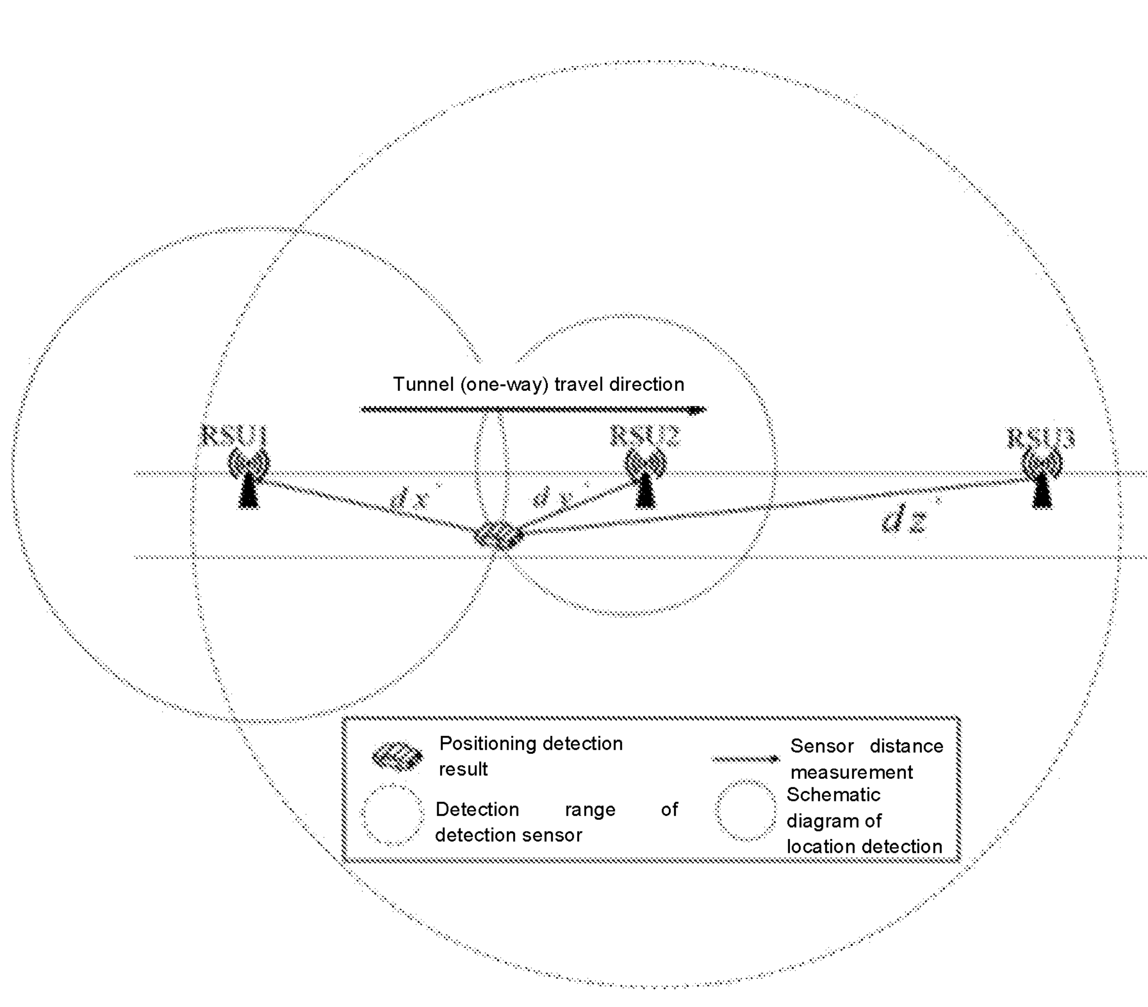
FIG. 6 is a schematic diagram of positioning a vehicle through two RSUs according to a embodiment of the disclosure.

As shown in FIG. 3, it is determined that a detection sensor detects two RSUs. Second distance information corresponding to the two RSUs is dx' and dy', where the RSU corresponding to dx is located at the rear of a vehicle and is marked as −dx', and the RSU corresponding to dy' is located in front of the vehicle and is marked as +dy'. Then, it is determined that a V2X OBU receives a first V2X message sent by three RSUs, and the three RSUs are an RSU1, an RSU2 and an RSU3 respectively, where first distance information corresponding to the RSU1 is d1, first distance information corresponding to the RSU2 is d2, and first distance information corresponding to the RSU3 is d3. It is determined that the vehicle has passed through the RSU1 and has not passed through the RSU2 and the RSU3 according to historical location information of the vehicle. Therefore, the first distance information corresponding to the RSU1 is marked as −d1, the first distance information corresponding to the RSU2 is marked as +d2, and the first distance information corresponding to the RSU3 is marked as +d3. Through comparison, it is determined that the relation of the first distance information corresponding to the two RSUs which the vehicle has not passed through is as follows: |d2|<|d3|. A positioning computation unit determines, according to the information, that the RSUs detected by the detection sensor are the RSU1 and the RSU2, and determines that the second distance information corresponding to the RSU1 is dx', and the second distance information corresponding to the RSU2 is dy'. The positioning computation unit positions the vehicle according to location information and the second distance information dx' of the RSU1, and location information and the second distance information dy' of the RSU2. A specific positioning process is as follows: as shown in FIG. 6, a circle is drawn by using an RSU1 as a center of the circle and dx' as a radius, and a circle is drawn by using an RSU2 as a center of the circle and dy' as a radius. Then, a location of a vehicle is determined in an intersection point obtained by solving an equation of the two circles. If the vehicle runs in a tunnel, a coordinate point located in the tunnel is the location of the vehicle.

Embodiment 3

Figure 4:
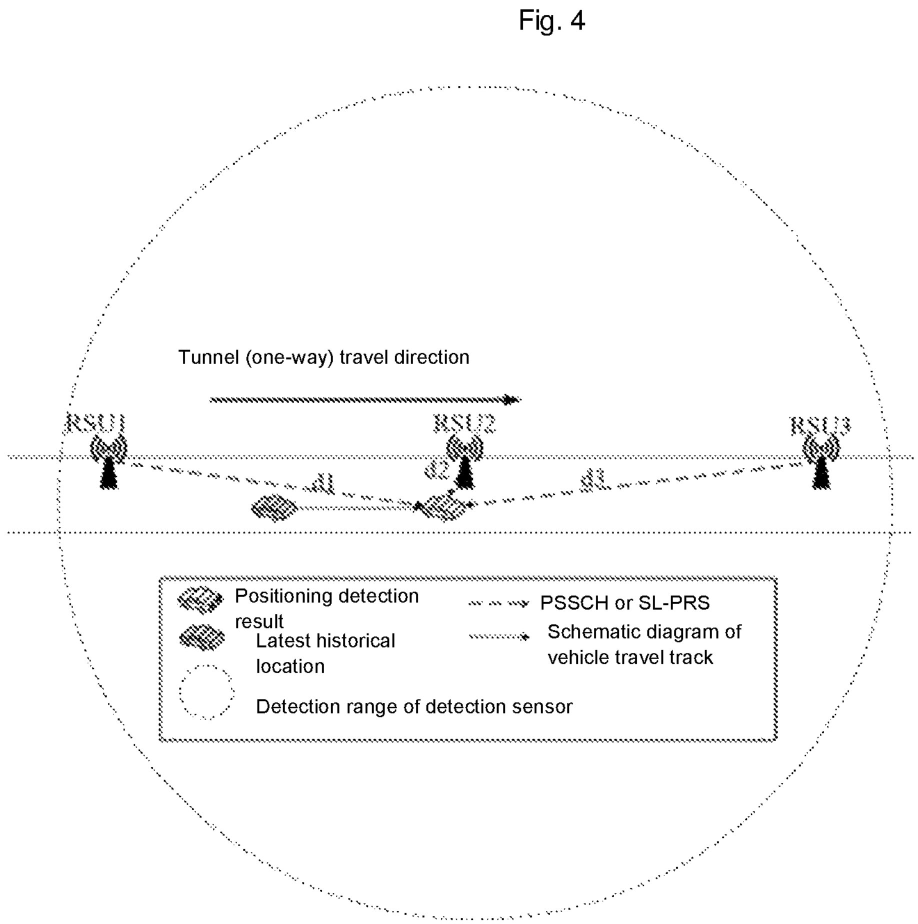
FIG. 4 is a schematic diagram of three RSUs detected by a detection sensor according to a embodiment of the disclosure.

As shown in FIG. 4, it is determined that a detection sensor detects three RSUs. Second distance information corresponding to the three RSUs is dx', dy' and dz', where the RSU corresponding to dx' is located at the rear of a vehicle, the second distance information corresponding to dx' is marked as −dx', the RSU corresponding to dy' is located in front of the vehicle, the second distance information corresponding to dy' is marked as +dy', the RSU corresponding to dz' is located in front of the vehicle, and the second distance information corresponding to dz' is marked as +dz'. Then, it is determined that a V2X OBU receives a first V2X message sent by the three RSUs. The three RSUs are an RSU1, an RSU2 and an RSU3, where first distance information corresponding to the RSU1 is d1, first distance information corresponding to the RSU2 is d2, and first distance information corresponding to the RSU3 is d3. It is determined that the vehicle has passed through the RSU1 and has not passed through the RSU2 and the RSU3 according to historical location information of the vehicle. Therefore, the first distance information corresponding to the RSU1 is marked as −d1, the first distance information corresponding to the RSU2 is marked as +d2, and the first distance information corresponding to the RSU3 is marked as +d3. Through comparison, it is determined that the relation of the first distance information corresponding to the two RSUs which the vehicle has not passed through is as follows: |d2|<|d3|. According to the information, a positioning computation unit determines that the RSUs detected by the detection sensor are the RSU1, the RSU2, and the RSU3, and determines that the second distance information corresponding to the RSU1 is dx', the second distance information corresponding to the RSU2 is dy', and the second distance information corresponding to the RSU3 is dz'. Finally, the positioning computation unit positions the vehicle according to location information and the second distance information dx' of the RSU1, location information and the second distance information dy' of the RSU2, and location information and the second distance information dz' of the RSU3.

It should be noted herein that under the condition that the detection sensor detects three or more RSUs, when the location of the vehicle is determined, two RSUs closest to the vehicle can be used as reference points for determination. The specific determination process is similar to the situation that the detection sensor detects two RSUs, which is not repeated herein.

It should further be noted herein that when the detection sensor detects that an absolute value of a distance between a certain RSU and the vehicle is less than a preset distance threshold (for example, ±10 m), deviation can occur when whether the vehicle has passed through the RSU is determined according to the historical location information of the vehicle. In order to avoid such deviation, positive values and negative values with which the first distance information in the first positioning information is marked can be further verified and corrected, and are then matched.

That is, after the RSUs are matched, a matching result is corrected according to a difference or variance of the corresponding first distance value (which has been marked with a positive value or a negative value) and the corresponding second distance value (which is marked with a positive value or a negative value) after matching. The difference or variance of the corresponding distance value in the corrected matching result is the smallest. Specifically, the matching result can be corrected as follows:

Firstly, differences/variances of the first distance values (which are marked with positive values and negative values) of the first distance information and the second distance values (which are marked with positive values and negative values) of the second positioning information of the RSU corresponding to the first distance information are solved separately, and absolute values of differences are solved and the sum of the absolute values is solved/the sum of the variances is solved to obtain a first value; secondly, under the condition that the first value is greater than a first preset threshold, on one hand, the largest first distance value or one to N first distance values marked with negative values are marked as positive values and rematched, and the sum of absolute values of differences/variances is solved to obtain a second value, where N is greater than or equal to 2 and N is an integer; on the other hand, the smallest first distance value or one to N first distance values marked with positive values are marked as negative values and rematched, and the sum of absolute values of differences/variances is solved to obtain a third value, where N is greater than or equal to 2 and N is an integer; and thirdly, a matching result corresponding to the smallest value in the first value, the second value, and the third value is determined as a final matching result.

It should be noted herein that the absolute values of the differences are solved and the sum of the absolute values is solved/the sum of the variances is solved, and the absolute values of the differences can further be solved and averaged/the variances can further be averaged, but are not limited to thereto.

Based on the above content, as an alternative embodiment, the step that the location of the vehicle is determined according to second positioning information between the vehicle and the at least one RSU detected by a detection sensor, the location information of the RSU, and the first positioning information includes:

Step 1, the RSU(s) located on a left side of a road, and/or the RSU(s) located on a right side of the road is determined, where the road is a road in which the vehicle is located.

Specifically, the RSU(s) located on the left side of the road and/or the RSU(s) located on the right side of the road can be determined according to the location information of the RSU and location information of a centerline of the road under the condition of determining the RSU(s) located on the left side of the road and/or the RSU(s) located on the right side of the road according to the location information of the RSU; and specifically, the relative location relation between the RSU and the vehicle in which the detection sensor is located can be determined according to the first angle information and the RSU located on the left side of the road or the RSU located on the right side of the road can be determined based on at least one of the following: a running direction of the vehicle under the condition that the RSU located on the left side of the road, the RSU located on the right side of the road are determined according to the first angle information.

Step 2, the RSU(s) located on the left side of the road and/or the RSU(s) located on the right side of the road is determined according to the second angle information.

Similarly, in the step, the relative location relation between the RSU and the vehicle in which the detection sensor is located can be determined according to the second angle information, and the RSU located on the left side of the road or the RSU located on the right side of the road are determined based on the running direction of the vehicle.

Step 3, the RSU located on the left side of the road and corresponding to the first distance information is matched with the RSU located on the left side of the road and corresponding to the second distance information one by one, and the RSU located on the right side of the road and corresponding to the first distance information is matched with the RSU located on the right side of the road and corresponding to the second distance information one by one, and matched location information of the RSU detected by the detection sensor is determined.

Step 4, the location of the vehicle is determined according to the matched location information of the RSU detected by the detection sensor and the second distance information in the second positioning information between the vehicle and the RSU detected by the detection sensor; and alternatively, the location of the vehicle is determined according to the matched location information of the RSU detected by the detection sensor and the second distance information and the second angle information in the second positioning information between the vehicle and the RSU detected by the detection sensor.

Similarly, in the step, under the condition that the second positioning information only includes the second distance information, the location of the vehicle can be determined according to the matched location information of the RSU detected by the detection sensor and the second distance information; under the condition that the second positioning information includes the second distance information and the second angle information, the location of the vehicle can be determined according to the matched location information of the RSU detected by the detection sensor, the second distance information, and the second angle information; and certainly, under the condition that the second positioning information includes the second distance information and the second angle information, the location of the vehicle can also be determined only according to the matched location information of the RSU detected by the detection sensor and the second distance information, which are not limited in the disclosure.

In the alternative embodiment, the RSU is classified into the RSU located on the left side of the road and the RSU located on the right side of the road, thereby matching the location information to the RSU located on the left side of the road with the RSU located on the right side of the road separately, avoiding a matching error caused by inaccurate distance information, and improving matching accuracy.

As an alternative embodiment, the step that the location of the vehicle is determined according to second positioning information between the vehicle and the at least one RSU detected by a detection sensor, the location information of the RSU, and the first positioning information includes:

Step 1, predicted location information of the vehicle is computed according to each of the first positioning information.

In the step, under the condition that one RSU is received and the first parameter is the fourth measurement parameter, predicted location information of the vehicle can be determined according to the first distance information and the first angle information in the first positioning information and the location information of the RSU, such that the location of the vehicle can be predicted based on a single RSU. Under the condition of receiving the first V2X messages sent by two or more RSUs, predicted location information of the vehicle can be solved by means of the TOA. Under the condition of receiving the first V2X messages sent by four or more RSUs, predicted location information of the vehicle can be solved based on the TDOA.

Step 2, relative location information between the vehicle and each of the RSUs is determined according to the predicted location information and the location information of each of the RSUs.

Step 3, an RSU sending the first V2X message is matched with an RSU detected by the detection sensor according to the relative location information and each of the second positioning information, and matched location information of the RSU detected by the detection sensor is determined.

Step 4, the location of the vehicle is determined according to the matched location information of the RSU detected by the detection sensor and the second positioning information. In the step, when the location of the vehicle is determined, the RSU currently matching the location information can be used as positioning reference points for computing the location of the vehicle.

Specific implementation of steps 3 and 4 is similar to the matching process and the process of determining the location of the vehicle, which is not repeated herein.

Further, as an alternative embodiment, the method further includes:

Step 1, a second V2X message sent by each of the RSUs is received, where the second V2X message carries parameter information related to a surface of the RSU.

The surface of the RSU is provided with a reflecting material, or the surface of each of the RSUs is a metasurface or a smart metasurface, and the parameter information includes at least one of:

a supported signal type, a supported frequency band range, and a feature point shape.

Step 2, detection data detected by the detection sensor is obtained.

Step 3, feature information in parameter information related to the surface of the RSU is obtained.

It should be noted herein that the feature information can be the feature point shape of the RSU.

Step 4, an RSU in the detection data is matched according to features indicated by the parameter information related to the surface of the RSU obtained from the second V2X message, and it is determined that the detection data includes the RSU under the condition of obtaining a matching result.

It should be noted herein that in the step, specifically, feature shapes of the RSUs can match the detection data one by one, so as to determine whether matching is successful. It is determined that a matching result is obtained when the matching is successful. In this case, it is determined that the detection data includes the RSU.

Step 5, the second positioning information between the vehicle and the RSU is determined under the condition that the detection data includes the RSU, where under the condition that the second positioning information includes the second angle information, the second angle information is determined as an included angle between a first direction and a second direction, where the first direction is an extension direction of a connecting line between the detection sensor and the RSU detected by the detection sensor, and the second direction is a running direction of the vehicle or a lane line direction.

In the step, specifically, as shown in FIG. 5, in the process of positioning the vehicle, under the condition that it is determined that the detection sensor detects one RSU, the location information matches the RSU detected by the detection sensor; then, an included angle θ between the detection sensor and the RSU is determined by using the location of the RSU as a reference point based on the second distance information dx and the second angle information detected by the detection sensor and the running direction of the vehicle; a horizontal coordinate hx and a longitudinal coordinate lx of the detection sensor relative to the RSU are solved according to dx and θ, and the location of the vehicle is determined based on the location information of the RSU and the horizontal coordinate and the longitudinal coordinate of the detection sensor relative to the RSU.

In the alternative embodiment, the second positioning information between the vehicle and the RSU is determined according to the detection data such that the vehicle can be accurately positioned based on the second distance information and the second angle information of a single RSU.

It should be noted herein that the second V2X message can be included in the first V2X message, or the second V2X message can be sent separately, which is not limited in the embodiment of the disclosure.

It should further be noted herein that the metasurface or the smart metasurface can improve reflection power by not changing a reflection angle of a light wave, a laser radar reflection wave/frequency modulation continuous wave, or a millimeter-wave radar reflection wave/frequency modulation continuous wave. In addition, in the alternative embodiment, the supported signal type at least includes light, an electromagnetic wave, laser, etc.

In the alternative embodiment, on one hand, the surface of the RSU is provided with the reflecting material, such that the light is effectively enhanced, or the surface of the RSU is set as the metasurface or the smart metasurface, and the light is effectively enhanced by configuring the reflection angle of the light, the electromagnetic wave or the laser unchanged and improving reflection intensity, or the surface of the RSU can be configured to detect the reflection wave or the frequency modulation continuous wave, which is significantly enhanced such that the problem that in a typical scenario having no GNSS, such as a tunnel, low illumination can affect a detection effect of a camera, and the number of distinguishable feature points in the environment is limited, such that it is difficult to achieve effective and accurate detection can be solved; and on the other hand, the second V2X message received can be used as prior information of the detection data detected by the detection sensor, thereby further improving a detection success rate and detection accuracy of the detection sensor.

Further, as an alternative embodiment, under the condition that the location of the vehicle is determined only according to the first positioning information and the location information of the RSU, the method further includes:

the location of the vehicle is predicted based on at least one of the following: real-time filtering of measurement data of an inertial measurement unit and real-time filtering of a vehicle driving parameter, under the condition that at least one of the first positioning information is not obtained between two adjacent moments of determining the location of the vehicle or in a process of determining the location of the vehicle, where the vehicle driving parameter includes at least one of a speed value, an acceleration value and an orientation angle value of the vehicle.

It should be noted herein that on one hand, the a vehicle driving parameter can be directly obtained from a vehicle body apparatus; and on the other hand, "real-time filtering" can be at least one of Kalman filter, mean filter, median filter, particle filter, etc., but is not limited thereto.

Further, as another alternative embodiment, under the condition that the location of the vehicle is determined according to the first positioning information, the second positioning information, and the location information of the RSU, the method further includes:

the location of the vehicle is predicted based on at least one of the following: real-time filtering of measurement data of an inertial measurement unit, and real-time filtering of a vehicle driving parameter, under the condition that at least one of the first positioning information and at least one of the second positioning information are not obtained between two adjacent moments of determining the location of the vehicle or in a process of determining the location of the vehicle, where the vehicle driving parameter includes at least one of a speed value, an acceleration value and an orientation angle value of the vehicle.

Similarly, the a vehicle driving parameter can be directly obtained from the vehicle body apparatus; and "real-time filtering" can be at least one of Kalman filter, mean filter, median filter, particle filter, etc., but is not limited thereto.

In the above two alternative embodiments, under at least one of the following condition: the detection sensor does not detect valid detection data of the RSU, and the on-board positioning system does not receive the first V2X message sent by the RSU, the location of the vehicle can be predicted based on at least one of the following: real-time filtering of measurement data of an IMU and the a vehicle driving parameter, such that when the detection range of the detection sensor is limited, or when obtaining frequency of accurate distance measurement information of the detection sensor and the V2X sidelink is low, filtering and location prediction are carried out based on IMU parameters, so as to effectively avoid positioning deviation during no accurate measurement value, and an accumulated error of the IMU is effectively eliminated when an accurate measurement value is obtained, so as to ensure continuous high-definition positioning performance.

As shown in FIG. 7, a embodiment of the disclosure provides a vehicle-road cooperative positioning method. The method is applied to an RSU, and includes:

Step 701, a first V2X message is sent to an on-board positioning system having a V2X OBU; and Alternatively, a first V2X message and an SL-PRS are sent to an on-board positioning system having a V2X OBU, where the first V2X message carries location information of the RSU.

It should be noted herein that the SL-PRS and the first V2X message can be simultaneously sent, or the SL-PRS can also be sent separately, which is not limited in the embodiment of the disclosure.

According to the embodiment of the disclosure, the first V2X message is sent to the on-board positioning system having the OBU, or the first V2X message and the SL-PRS are sent to the on-board positioning system having the OBU, such that the on-board positioning system can accurately position the vehicle according to the received messages without a GNSS and without dependence on a high-definition map.

As an alternative embodiment, a surface of the RSU is covered with a reflecting material, or is a metasurface or a smart metasurface.

It should be noted herein that the metasurface or the smart metasurface can improve reflection power by not changing a reflection angle of a light wave, a laser radar reflection wave/frequency modulation continuous wave, or a millimeter-wave radar reflection wave/frequency modulation continuous wave.

In the alternative embodiment, the surface of the RSU is provided with the reflecting material, or is set as the metasurface or the smart metasurface such that light can be effectively enhanced, or the surface of the RSU can be configured to detect the reflection wave or the frequency modulation continuous wave, which is significantly enhanced, such that feature points in an environment having low illumination and sparse feature points are accurately detected, and finally, the problem that in a typical scenario having no GNSS, such as a tunnel, low illumination can affect a detection effect of a camera, and the number of distinguishable feature points in the environment is limited, such that it is difficult to achieve effective and accurate detection can be solved.

As an alternative embodiment, the method further includes:

a second V2X message is sent to the on-board positioning system, where the second V2X message carries parameter information related to a surface of the RSU, and the parameter information includes at least one of:

a supported signal type, a supported frequency band range, and a feature point shape.

It should be noted herein that the second V2X message can be included in the first V2X message for sending, or the second V2X message can be sent separately, which is not limited in the embodiment of the disclosure.

In the alternative embodiment, the second V2X message is sent to the on-board positioning system such that the on-board positioning system can verify the detection data detected by the detection sensor by using the feature point shape in the parameter information related to the surface of the RSU carried in the second V2X message as a prior parameter, thereby avoiding traditional training and learning of the on-board positioning system, and improving detection efficiency and accuracy.

As shown in FIG. 8, a embodiment of the disclosure further provides a vehicle-road cooperative positioning apparatus. The apparatus is applied to an on-board positioning system, and includes:

a first reception component 801 configured to receive a first V2X message sent by at least one RSU, where the first V2X message carries location information of the RSU;

a first determination component 802 configured to determine first positioning information between a vehicle and the RSU based on a first parameter, where the first positioning information includes first distance information, or includes first distance information and first angle information, and the first parameter is determined by measuring a signal transmitted on a V2X sidelink; and a second determination component 803 configured to determine a location of the vehicle according to the first positioning information and the location information of the RSU.

In the embodiment of the disclosure, the first reception component 801 receives the first V2X message sent by the at least one RSU, where the first V2X message carries location information of the RSU; then the first determination component 802 determines the first positioning information between the vehicle and the RSU based on the first parameter, where the first positioning information includes the first distance information, or includes the first distance information and the first angle information, and the first parameter is determined by measuring the signal transmitted on the V2X sidelink; and finally, the second determination component 803 determines the location of the vehicle according to the first positioning information and the location information of the RSU. Thus, the on-board positioning system can accurately position the vehicle according to the V2X messages and a measurement result of the signal transmitted on the V2X sidelink without a GNSS and without dependence on a high-definition map.

Alternatively, the second determination component 803 includes:

a first determination sub-component configured to determine the location of the vehicle according to second positioning information between the vehicle and the at least one RSU detected by a detection sensor, the location information of the RSU, and the first positioning information, where the second positioning information includes second distance information, or includes second distance information and second angle information.

Further, the apparatus further includes:

a first obtaining component configured to obtain detection data from the detection sensor; and a third determination component configured to determine validity of the detection data, where the second determination sub-component is specifically configured to determine the location of the vehicle according to the second positioning information between the vehicle and the at least one RSU detected by the detection sensor, the location information of the RSU, and the first positioning information under the condition of determining that the detection data is valid.

Alternatively, the first parameter includes at least one of:

a first measurement parameter, where the first measurement parameter is RSRP measured based on a DMRS of a PSCCH, or is RSRP measured based on a DMRS of a PSSCH;

a second measurement parameter, where the second measurement parameter is TOA or a TDOA based on the PSCCH, or is TOA or a TDOA based on the PSSCH;

a third measurement parameter, where the third measurement parameter is RSRP measured based on a sidelink-positioning reference signal (SL-PRS) sent by the RSU; and a fourth measurement parameter, where the fourth measurement parameter is at least one of signal transmission time, a signal transmission time difference, and a signal transmission angle parameter measured based on the SL-PRS.

Alternatively, the first determination component 801 includes:

a second determination sub-component configured to determine first indication information in the first positioning information based on the first parameter, where the first indication information is to indicate a type or confidence of the first distance information.

Alternatively, the second determination sub-component includes:

a first determination component configured to determine that the first indication information is to indicate that the type of the first distance information is an inaccurate measurement type under the condition that the first parameter is the first measurement parameter or the third measurement parameter;

a second determination component configured to determine that the first indication information is to indicate that the type of the first distance information is an inaccurate measurement type, or that the first indication information is to indicate that the confidence of the first distance information is preset confidence under the condition that the first parameter is the second measurement parameter; and a third determination component configured to determine that the first indication information is to indicate that the confidence of the first distance information is estimated confidence, or that the first indication information is to indicate that the type of the first distance information is an accurate measurement type under the condition that the first parameter is the fourth measurement parameter.

Alternatively, the second determination component 803 includes:

a third determination sub-component configured to determine the location of the vehicle according to second positioning information between the vehicle and the at least one RSU detected by the detection sensor, the location information of the RSU and the first positioning information under the condition that the type of the first distance information indicated by the first indication information is an inaccurate measurement type, the confidence of the first distance information indicated by the first indication information is greater than or equal to a confidence threshold, or the confidence of the first distance information indicated by the first indication information is greater than distance measurement accuracy of a detection sensor, where the second positioning information includes second distance information, or includes second distance information and second angle information; and alternatively, determine the location of the vehicle according to the first positioning information and the location information of the RSU under the condition that the first indication information indicates that the confidence of the first distance information is less than or equal to distance measurement accuracy of a detection sensor, or the type of the first distance information indicated by the first indication information is an accurate measurement type.

Further, the apparatus further includes:

a second obtaining component configured to obtain detection data from the detection sensor; and a fourth determination component configured to determine validity of the detection data, where the third determination sub-component is specifically configured to determine the location of the vehicle according to the second positioning information between the vehicle and the at least one RSU detected by the detection sensor, the location information of the RSU, and the first positioning information under the condition of determining that the detection data is valid.

Alternatively, the third determination component is specifically configured to determine that the detection data is valid under the condition that the number of sampling points occupied by the at least one RSU detected by the detection sensor is greater than or equal to a first preset value, or a proportion of the number of sampling points occupied by the at least one RSU detected by the detection sensor in the total number of sampling points is greater than or equal to a second preset value.

Alternatively, the fourth determination component is specifically configured to determine that the detection data is valid under the condition that the number of sampling points occupied by the at least one RSU detected by the detection sensor is greater than or equal to a first preset value, or a proportion of the number of sampling points occupied by the at least one RSU detected by the detection sensor in the total number of sampling points is greater than or equal to a second preset value.

Alternatively, the fourth determination component includes:

a fourth determination sub-component configured to determine distance measurement accuracy of each of the RSUs detected by the detection sensor according to the number of sampling points occupied by each of the RSUs detected by the detection sensor, or a proportion of the number of sampling points occupied by each of the RSUs in the total number of sampling points; and a fifth determination sub-component configured to determine that the detection data is valid under the condition that at least one of distance measurement accuracy of the RSUs detected by the detection sensor is less than the confidence of the first distance information indicated by the first indication information.

Alternatively, the third determination sub-component includes:

a fourth determination component configured to match an RSU sending the first V2X message with an RSU detected by the detection sensor according to the first positioning information and the second positioning information, and matched location information of the RSU detected by the detection sensor is determined; and a fifth determination component configured to determine the location of the vehicle according to the matched location information of the RSU detected by the detection sensor and the second distance information in the second positioning information between the vehicle and the RSU detected by the detection sensor; and alternatively, determine the location of the vehicle according to the matched location information of the RSU detected by the detection sensor, and the second distance information and the second angle information in the second positioning information between the vehicle and the RSU detected by the detection sensor.

Alternatively, the fourth determination sub-component includes:

a sixth determination component configured to match an RSU sending the first V2X message with an RSU detected by the detection sensor according to the first positioning information and the second positioning information, and matched location information of the RSU detected by the detection sensor is determined; and a seventh determination component configured to determine the location of the vehicle according to the matched location information of the RSU detected by the detection sensor and the second distance information in the second positioning information between the vehicle and the RSU detected by the detection sensor; and alternatively, determine the location of the vehicle according to the matched location information of the RSU detected by the detection sensor, and the second distance information and the second angle information in the second positioning information between the vehicle and the RSU detected by the detection sensor.

Alternatively, the fourth determination component includes:

a first determination sub-component configured to determine, according to historical location information of the vehicle and the location information of each of the RSUs, the RSU(s) which the vehicle has passed through and/or the RSU(s) which the vehicle has not passed through from the at least one RSU sending the first V2X message, where the RSU which the vehicle has passed through is determined as an RSU located at the rear of the vehicle, and the RSU which the vehicle has not passed through is determined as an RSU located in front of the vehicle;

a second determination sub-component configured to determine the RSU(s) located at the rear of the vehicle and/or the RSU(s) located in front of the vehicle from the at least one RSU detected by the detection sensor;

a first processing sub-component configured to mark a distance value in the first distance information corresponding to the RSU located at the rear of the vehicle and a distance value in the second distance information corresponding to the RSU located at the rear of the vehicle as negative values, and mark a distance value in the first distance information corresponding to the RSU located in front of the vehicle and a distance value in the second distance information corresponding to the RSU located in front of the vehicle as positive values; and a first matching sub-component configured to match, from large distance values to small distance values, the RSU corresponding to the second distance information having the distance value being a negative value with the RSU corresponding to the first distance information having the distance value being a negative value one by one; and match, from small distance values to large distance values, the RSU corresponding to the second distance information having the distance value being a positive value with the RSU corresponding to the first distance information having the distance value being a positive value one by one.

Alternatively, the sixth determination component includes:

a third determination sub-component configured to determine, according to historical location information of the vehicle and the location information of each of the RSUs, the RSU(s) which the vehicle has passed through and/or the RSU(s) which the vehicle has not passed through from the at least one RSU sending the first V2X message, where the RSU which the vehicle has passed through is determined as an RSU located at the rear of the vehicle, and the RSU which the vehicle has not passed through is determined as an RSU located in front of the vehicle;

a fourth determination sub-component configured to determine the RSU(s) located at the rear of the vehicle and/or the RSU(s) located in front of the vehicle from the at least one RSU detected by the detection sensor;

a second processing sub-component configured to mark a distance value in the first distance information corresponding to the RSU located at the rear of the vehicle and a distance value in the second distance information corresponding to the RSU located at the rear of the vehicle as negative values, and mark a distance value in the first distance information corresponding to the RSU located in front of the vehicle and a distance value in the second distance information corresponding to the RSU located in front of the vehicle as positive values; and a second matching sub-component configured to match, from large distance values to small distance values, the RSU corresponding to the second distance information having the distance value being a negative value with the RSU corresponding to the first distance information having the distance value being a negative value one by one; and match, from small distance values to large distance values, the RSU corresponding to the second distance information having the distance value being a positive value with the RSU corresponding to the first distance information having the distance value being a positive value one by one.

Alternatively, the third determination sub-component includes:

an eighth determination component configured to determine the RSU(s) located on a left side of a road and/or the RSU(s) located on a right side of the road according to the location information of the RSU or the first angle information, where the road is a road in which the vehicle is located;

a ninth determination component configured to determine the RSU(s) located on the left side of the road and/or the RSU(s) located on the right side of the road according to the second angle information;

a first matching component configured to match the RSU located on the left side of the road and corresponding to the first distance information with the RSU located on the left side of the road and corresponding to the second distance information one by one, and match the RSU located on the right side of the road and corresponding to the first distance information with the RSU located on the right side of the road and corresponding to the second distance information one by one, and matched location information of the RSU detected by the detection sensor is determined; and a tenth determination component configured to determine the location of the vehicle according to the matched location information of the RSU detected by the detection sensor and the second distance information in the second positioning information between the vehicle and the RSU detected by the detection sensor; and alternatively, determine the location of the vehicle according to the matched location information of the RSU detected by the detection sensor and the second distance information and the second angle information in the second positioning information between the vehicle and the RSU detected by the detection sensor.

Alternatively, the fourth determination sub-component includes:

an eleventh determination component configured to determine the RSU(s) located on a left side of a road and/or the RSU(s) located on a right side of the road according to the location information of the RSU or the first angle information, where the road is a road in which the vehicle is located;

a twelfth determination component configured to determine the RSU(s) located on the left side of the road and/or the RSU(s) located on the right side of the road according to the second angle information;

a second matching component configured to match the RSU located on the left side of the road and corresponding to the first distance information with the RSU located on the left side of the road and corresponding to the second distance information one by one, and match the RSU located on the right side of the road and corresponding to the first distance information with the RSU located on the right side of the road and corresponding to the second distance information one by one, and matched location information of the RSU detected by the detection sensor is determined; and a thirteenth determination component configured to determine the location of the vehicle according to the matched location information of the RSU detected by the detection sensor and the second distance information in the second positioning information between the vehicle and the RSU detected by the detection sensor; and alternatively, determine the location of the vehicle according to the matched location information of the RSU detected by the detection sensor and the second distance information and the second angle information in the second positioning information between the vehicle and the RSU detected by the detection sensor.

Alternatively, the first determination sub-component includes:

a first computation component configured to compute predicted location information of the vehicle according to each of the first positioning information;

a fourteenth determination component configured to determine relative location information between the vehicle and each of the RSUs according to the predicted location information and the location information of each of the RSUs;

a third matching component configured to match an RSU sending the first V2X message with an RSU detected by the detection sensor according to the relative location information and each of the second positioning information, and matched location information of the RSU detected by the detection sensor is determined; and a fifteenth determination component configured to determine the location of the vehicle according to the matched location information of the RSU detected by the detection sensor and the second positioning information.

Alternatively, the fourth determination sub-component includes:

a second computation component configured to compute predicted location information of the vehicle according to each of the first positioning information;

a sixteenth determination component configured to determine relative location information between the vehicle and each of the RSUs according to the predicted location information and the location information of each of the RSUs;

a fourth matching component configured to match an RSU sending the first V2X message with an RSU detected by the detection sensor according to the relative location information and each of the second positioning information, and matched location information of the RSU detected by the detection sensor is determined; and a seventeenth determination component configured to determine the location of the vehicle according to the matched location information of the RSU detected by the detection sensor and the second positioning information.

Further, the apparatus further includes:

a second reception component configured to receive a second V2X message sent by each of the RSUs, where the second V2X message carries parameter information related to a surface of the RSU;

a third obtaining component configured to obtain detection data detected by the detection sensor;

a fourth obtaining component configured to obtain feature information in parameter information related to the surface of the RSU;

a fifth determination component configured to match an RSU in the detection data according to features indicated by the parameter information related to the surface of the RSU obtained from the second V2X message, and determine that the detection data includes the RSU under the condition of obtaining a matching result; and a sixth determination component configured to determine the second positioning information between the vehicle and the RSU under the condition that the detection data includes the RSU, where under the condition that the second positioning information includes the second angle information, the second angle information is determined as an included angle between a first direction and a second direction, where the first direction is an extension direction of a connecting line between the detection sensor and the RSU detected by the detection sensor, and the second direction is a running direction of the vehicle or a lane line direction; and the surface of the RSU is provided with a reflecting material, or the surface of each of the RSUs is a metasurface or a smart metasurface, and the parameter information includes at least one of:

a supported signal type, a supported frequency band range, and a feature point shape.

Further, the apparatus further includes:

a first prediction component configured to predict the location of the vehicle based on real-time filtering of measurement data of an inertial measurement unit and/or a vehicle driving parameter under the condition that at least one of the first positioning information is not obtained between two adjacent moments of determining the location of the vehicle or in a process of determining the location of the vehicle, where the vehicle driving parameter includes at least one of a speed value, an acceleration value and an orientation angle value of the vehicle.

Further, the apparatus further includes:

a second prediction component configured to predict the location of the vehicle based on real-time filtering of measurement data of an inertial measurement unit and/or a vehicle driving parameter under the condition that at least one of the first positioning information is not obtained between two adjacent moments of determining the location of the vehicle or in a process of determining the location of the vehicle, where the vehicle driving parameter includes at least one of a speed value, an acceleration value and an orientation angle value of the vehicle.

The vehicle-road cooperative positioning apparatus of the embodiment of the disclosure corresponds to the vehicle-road cooperative positioning method that is applied to the on-board positioning system. All implementation means of the vehicle-road cooperative positioning method are all applicable to the embodiment of the vehicle-road cooperative positioning apparatus, and can also achieve the same technical effect.

Figure 9:
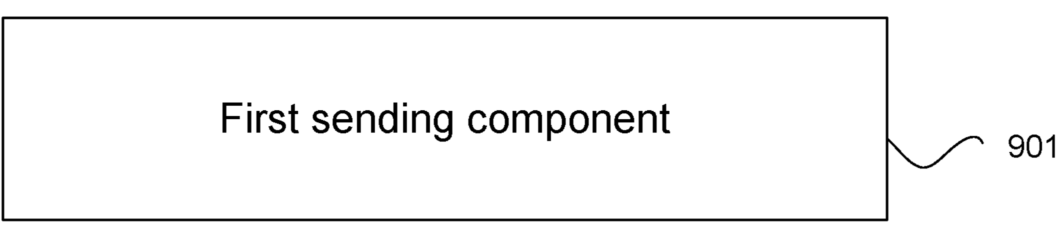
FIG. 9 is a second schematic structural diagram of a vehicle-road cooperative positioning apparatus according to a embodiment of the disclosure.

As shown in FIG. 9, a embodiment of the disclosure further provides a vehicle-road cooperative positioning apparatus. The apparatus is applied to an RSU, and includes:

a first sending component 901 configured to send a first V2X message to an on-board positioning system having a V2X OBU; and alternatively, send a first V2X message and an SL-PRS to an on-board positioning system having a V2X on-board unit, where the first V2X message carries location information of the RSU.

Alternatively, a surface of the RSU is covered with a reflecting material, or is a metasurface or a smart metasurface.

Further, the apparatus further includes:

a second sending component configured to send a second V2X message to the on-board positioning system, where the second V2X message carries parameter information related to a surface of the RSU, and the parameter information includes at least one of:

a supported signal type, a supported frequency band range, and a feature point shape.

The vehicle-road cooperative positioning apparatus of the embodiment of the disclosure corresponds to the vehicle-road cooperative positioning method that is applied to the RSU. All implementation means of the vehicle-road cooperative positioning method are all applicable to the embodiment of the vehicle-road cooperative positioning apparatus, and can also achieve the same technical effect.

Figure 10:
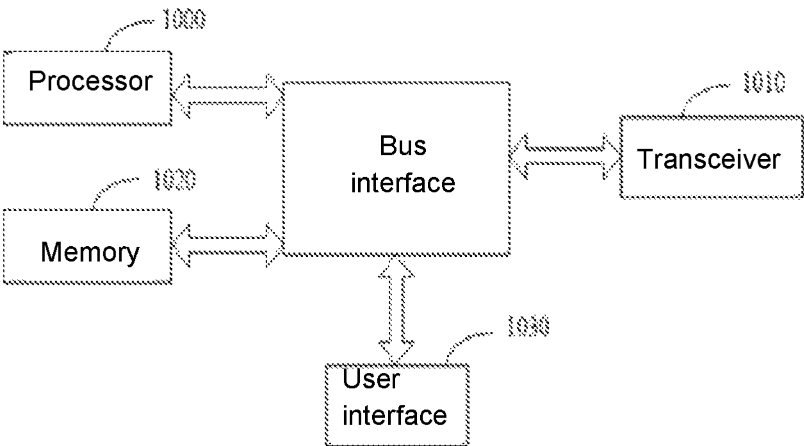
FIG. 10 is a schematic structural diagram of an on-board positioning system according to a embodiment of the disclosure.

In order to better achieve the above objective, as shown in FIG. 10, a embodiment of the disclosure further provides an on-board positioning system. The on-board positioning system includes: a processor 1000; and a memory 1020 connected to the processor 1000 by means of a bus interface, where the memory 1020 is configured to store programs and data used by the processor 1000 when executing operations, and the processor 1000 calls and executes the programs and the data stored in the memory 1020.

A transceiver 1010 is connected to the bus interface, and is configured to receive a first V2X message sent by at least one RSU under the control of the processor 1000, where the first V2X message carries location information of the RSU; and the processor 1000 is configured to read the programs in the memory 1020 and execute the following steps:

first positioning information between a vehicle and the RSU is determined based on a first parameter, where the first positioning information includes first distance information, or includes first distance information and first angle information, and the first parameter is determined by measuring a signal transmitted on a V2X sidelink; and a location of the vehicle is determined according to the first positioning information and the location information of the RSU.

According to the on-board positioning system provided in the embodiment of the disclosure, the first V2X message is received, the first positioning information is determined based on the first parameter, and the location of the vehicle is determined according to the first positioning information and the location information of the RSU such that the vehicle is accurately positioned without a GNSS and without dependence on a high-definition map.

It should be noted that the on-board positioning system provided in the above embodiment of the disclosure is an on-board positioning system capable of executing the vehicle-road cooperative positioning method above, and thus the vehicle-road cooperative positioning method above applied to the on-board positioning system is applicable to the on-board positioning system, and can achieve the same or similar beneficial effects.

In FIG. 10, a bus architecture can include any number of interconnected buses and bridges. Specifically, various circuits of one or more processors represented by the processor 1000 and the memory represented by the memory 1020 are linked together. The bus architecture can further link various other circuits such as a peripheral, a voltage regulator, and a power management circuit, which are well known in the art, and therefore, will not be described any further herein. The bus interface provides an interface. The transceiver 1010 can be multiple elements, i.e., including a transmitter and a receiver, which provide units configured to communicate with various other apparatus on a transmission medium. For different units, the user interface 1030 can further be an interface that can be externally connected to or internally connected to a desired device. The connected device includes, but not limited to, a keypad, a display, a speaker, a microphone, a joystick, etc. The processor 1000 is responsible for managing the bus architecture and general processing, and the memory 1020 can store data used by the processor 1000 when executing operations.

An embodiment of the disclosure further provides an RSU. The RSU includes: a processor; and a memory connected to the processor by means of a bus interface, where the memory is configured to store programs and data used by the processor when executing operations, and the processor calls and executes the programs and the data stored in the memory.

A transceiver is connected to the bus interface, and is configured to execute the following steps under the control of the processor:

a first V2X message is sent to an on-board positioning system having a V2X OBU; and alternatively, a first V2X message and an SL-PRS are sent to an on-board positioning system having a V2X OBU, where the first V2X message carries location information of the RSU.

According to the RSU provided in the embodiment of the disclosure, the first V2X message is sent to the on-board positioning system having a V2X OBU, or the first V2X message and the SL-PRS are sent to the on-board positioning system having a V2X OBU such that the on-board positioning system can accurately position the vehicle according to the message received without a GNSS and without dependence on a high-definition map.

It should be noted that the RSU provided in the above embodiment of the disclosure is an RSU capable of executing the vehicle-road cooperative positioning method above, and thus the vehicle-road cooperative positioning method above applied to the RSU is applicable to the RSU, and can achieve the same or similar beneficial effects.

It should be noted herein that the structure of the RSU is similar to that of the on-board positioning system. The structure of the RSU can refer to FIG. 10.

Those skilled in the art can understand that all or some of the steps to implement the above examples can be completed by means of hardware, or by instructing relevant hardware by means of a computer program, and the computer program includes instructions to execute some or all of the steps of the method above; and the computer program can be stored in a readable storage medium, and the storage medium can be any form of storage medium.

In addition, a embodiment of the disclosure further provides a computer-readable storage medium. The computer-readable storage medium stores a program, where the program implements various processes of the examples of the vehicle-road cooperative positioning method above when executed by a processor, and can achieve the same technical effect, which is not be repeated herein in order to avoid repetition. The computer-readable storage medium is, for example, a read-only memory (ROM), a random access memory (RAM), a magnetic disc, an optical disc, etc.

In addition, it should be pointed out that in the apparatus and method of the disclosure, the components or steps can be decomposed and/or recombined obviously. These decompositions and/or recombinations should be considered as equivalent solutions to the disclosure. Moreover, the steps of executing the above series of processing can be naturally executed according to the sequence of description or time, but do not necessarily need to be executed according to the sequence of description or time. Some steps can be executed in parallel or independently of each other. Those of ordinary skill in the art can understand that all or any steps or components of the method and apparatus of the disclosure can be implemented in hardware, firmware, software, or a combination of the hardware, the firmware and the software in any computing apparatus (including processors, storage media, etc.) or network of the computing apparatus, which can be achieved by those of ordinary skill in the art by applying basic programming skills thereof after reading the description of the disclosure.

Therefore, the objective of the disclosure can further be implemented by running a program or a set of programs on any computing apparatus. The computing apparatus can be a well-known general apparatus. Therefore, the objective of the disclosure can also be implemented only by providing a program product including program codes for implementing the method or apparatus. That is, such a program product also constitutes the disclosure, and the storage medium storing such a program product can also constitute the disclosure. Obviously, the storage medium can be any well-known storage medium or any storage medium developed in the future.

Finally, it should further be noted that relational terms herein such as first and second are only configured to distinguish one entity or operation from another entity or operation without necessarily requiring or implying any actual such relation or sequence between such entities or operations. Moreover, the terms “comprise” and “include” or any other variations thereof are intended to cover nonexclusive inclusions, such that a process, a method, an article, or a terminal device including a series of elements not only includes those elements, but also includes other elements that are not explicitly listed, or further includes inherent elements of the process, the method, the article, or the device. Without more restrictions, the elements defined by the sentence "comprising a . . . " and "including a . . . " do not exclude the existence of other identical elements in the process, the method, the article, or the device including the elements.

What are described above are preferred embodiments of the disclosure. It should be pointed out that several improvements and modifications can further be made by those of ordinary skill in the art without deviating from the principle of the disclosure, and these improvements and modifications shall be considered as the scope of protection of the disclosure.

What is claimed is:

1. A vehicle-road cooperative positioning method, applied to an on-board positioning system, and comprising:

receiving a first vehicle to everything (V2X) message sent by at least one road side unit (RSU), wherein the first V2X message carries location information of the RSU;

determining first positioning information between a vehicle and the RSU based on a first parameter, wherein the first positioning information comprises first distance information, or comprises first distance information and first angle information, and the first parameter is determined by measuring a signal transmitted on a V2X sidelink;

obtaining detection data from the detection sensor;

determining validity of the detection data; and determining a location of the vehicle according to the first positioning information and the location information of the RSU;

wherein determining the location of the vehicle according to the first positioning information and the location information of the RSU comprises: determining the location of the vehicle according to second positioning information between the vehicle and the at least one RSU detected by a detection sensor, the location information of the RSU, and the first positioning information, wherein the second positioning information comprises second distance information, or comprises second distance information and second angle information; and determining the location of the vehicle according to the second positioning information between the vehicle and the at least one RSU detected by the detection sensor, the location information of the RSU, and the first positioning information comprises: determining the location of the vehicle according to the second positioning information between the vehicle and the at least one RSU detected by the detection sensor, the location information of the RSU, and the first positioning information under a condition of determining that the detection data is valid.

2. The method according to claim 1, wherein the first parameter comprises at least one of:

a first measurement parameter, wherein the first measurement parameter is reference signal received power (RSRP) measured based on a demodulation reference signal (DMRS) of a physical sidelink control channel (PSCCH), or is RSRP measured based on a DMRS of a physical sidelink shared channel (PSSCH);

a second measurement parameter, wherein the second measurement parameter is time of arrival (TOA) or a time difference of arrival (TDOA) based on the PSCCH, or is TOA or a TDOA based on the PSSCH;

a third measurement parameter, wherein the third measurement parameter is RSRP measured based on a sidelink-positioning reference signal (SL-PRS) sent by the RSU; and a fourth measurement parameter, wherein the fourth measurement parameter is at least one of signal transmission time, a signal transmission time difference, and a signal transmission angle parameter measured based on the SL-PRS.

3. The method according to claim 2, wherein determining the first positioning information between the vehicle and the RSU based on the first parameter further comprises:

determining first indication information in the first positioning information based on the first parameter, wherein the first indication information is to indicate a type or confidence of the first distance information.

4. The method according to claim 3, wherein determining the first indication information in the first positioning information based on the first parameter comprises:

determining that the first indication information indicates that the type of the first distance information is an inaccurate measurement type under a condition that the first parameter is the first measurement parameter or the third measurement parameter;

determining that the first indication information indicates that the type of the first distance information is an inaccurate measurement type, or that the first indication information indicates that confidence of the first distance information is a preset confidence under a condition that the first parameter is the second measurement parameter; and determining that the first indication information indicates that the confidence of the first distance information is estimated confidence, or that the first indication information indicates that a type of the first distance information is an accurate measurement type under a condition that the first parameter is the fourth measurement parameter.

5. The method according to claim 3, wherein determining the location of the vehicle according to the first positioning information and the location information of the RSU comprises one of the following:

determining the location of the vehicle according to second positioning information between the vehicle and the at least one RSU detected by a detection sensor, the location information of the RSU, and the first positioning information under a condition that the type of the first distance information indicated by the first indication information is an inaccurate measurement type, or the confidence of the first distance information indicated by the first indication information is greater than or equal to a confidence threshold, or the confidence of the first distance information indicated by the first indication information is greater than distance measurement accuracy of a detection sensor, wherein the second positioning information comprises second distance information, or comprises second distance information and second angle information;

determining the location of the vehicle according to the first positioning information and the location information of the RSU under a condition that the confidence of the first distance information indicated by the first indication information is less than or equal to distance measurement accuracy of a detection sensor, or the type of the first distance information indicated by the first indication information is an accurate measurement type.

6. The method according to claim 1, wherein determining validity of the detection data comprises:

under a condition that a number of sampling points occupied by the at least one RSU detected by the detection sensor is greater than or equal to a first preset value, or a proportion of the number of sampling points occupied by the at least one RSU detected by the detection sensor in a total number of sampling points is greater than or equal to a second preset value, determining that the detection data is valid.

7. The method according to claim 1, wherein determining validity of the detection data comprises:

determining distance measurement accuracy of each of the RSUs detected by the detection sensor according to a number of sampling points occupied by each of the RSUs detected by the detection sensor, or a proportion of the number of sampling points occupied by each of the RSUs in a total number of sampling points; and determining that the detection data is valid under a condition that at least one of distance measurement accuracy of the RSUs detected by the detection sensor is less than the confidence of the first distance information indicated by the first indication information.

8. The method according to claim 1, wherein determining the location of the vehicle according to the second positioning information between the vehicle and the at least one RSU detected by the detection sensor, the location information of the RSU, and the first positioning information comprises:

matching an RSU sending the first V2X message with an RSU detected by the detection sensor according to the first positioning information and the second positioning information, and determining matched location information of the RSU detected by the detection sensor;

determining the location of the vehicle according to the matched location information of the RSU detected by the detection sensor and the second distance information in the second positioning information between the vehicle and the RSU detected by the detection sensor; or, determining the location of the vehicle according to the matched location information of the RSU detected by the detection sensor, and the second distance information and the second angle information in the second positioning information between the vehicle and the RSU detected by the detection sensor.

9. The method according to claim 8, wherein matching the RSU sending the first V2X message with the RSU detected by the detection sensor according to the first positioning information and the second positioning information, and determining the matched location information of the RSU detected by the detection sensor comprises:

for the at least one RSU sending the first V2X message, according to historical location information of the vehicle and the location information of each of the RSUs, determining the RSU(s) which the vehicle has passed through, and/or the RSU(s) which the vehicle has not passed through, wherein the RSU which the vehicle has passed through is determined as an RSU located at a rear of the vehicle, and the RSU which the vehicle has not passed through is determined as an RSU located in front of the vehicle;

for the at least one RSU detected by the detection sensor, determining the RSU(s) located at a rear of the vehicle, and/or the RSU(s) located in front of the vehicle;

marking a distance value in the first distance information corresponding to the RSU located at the rear of the vehicle and a distance value in the second distance information corresponding to the RSU located at the rear of the vehicle as negative values, and marking a distance value in the first distance information corresponding to the RSU located in front of the vehicle and a distance value in the second distance information corresponding to the RSU located in front of the vehicle as positive values;

matching, from large distance values to small distance values, the RSU corresponding to the second distance information having the distance value being a negative value with the RSU corresponding to the first distance information having the distance value being a negative value one by one; and matching, from small distance values to large distance values, the RSU corresponding to the second distance information having the distance value being a positive value with the RSU corresponding to the first distance information having the distance value being a positive value one by one.

10. The method according to claim 1, wherein determining the location of the vehicle according to the second positioning information between the vehicle and the at least one RSU detected by the detection sensor, the location information of the RSU, and the first positioning information comprises:

according to the location information of the RSU or the first angle information, determining the RSU(s) located on a left side of a road, and/or the RSU(s) located on a right side of the road, wherein the road is a road in which the vehicle is located;

according to the second angle information, determining the RSU(s) detected by the detection sensor located on the left side of the road, and/or the RSU(s) detected by the detection sensor located on the right side of the road;

matching the RSU located on the left side of the road and corresponding to the first distance information with the RSU located on the left side of the road and corresponding to the second distance information one by one, and matching the RSU located on the right side of the road and corresponding to the first distance information with the RSU located on the right side of the road and corresponding to the second distance information one by one, determining the matched location information of the RSU detected by the detection sensor;

determining the location of the vehicle according to the matched location information of the RSU detected by the detection sensor and the second distance information in the second positioning information between the vehicle and the RSU detected by the detection sensor; or, determining the location of the vehicle according to the matched location information of the RSU detected by the detection sensor and the second distance information and the second angle information in the second positioning information between the vehicle and the RSU detected by the detection sensor.

11. The method according to claim 1, wherein determining the location of the vehicle according to the second positioning information between the vehicle and the at least one RSU detected by the detection sensor, the location information of the RSU, and the first positioning information comprises:

computing predicted location information of the vehicle according to each of the first positioning information;

determining relative location information between the vehicle and each of the RSUs according to the predicted location information and the location information of each of the RSUs;

matching an RSU sending the first V2X message with an RSU detected by the detection sensor according to the relative location information and each of the second positioning information, and determining matched location information of the RSU detected by the detection sensor; and determining the location of the vehicle according to the matched location information of the RSU detected by the detection sensor and the second positioning information.

12. The method according to claim 1, further comprising:

receiving a second V2X message sent by each of the RSUs, wherein the second V2X message carries parameter information related to a surface of the RSU;

obtaining detection data detected by the detection sensor;

obtaining feature information in parameter information related to the surface of the RSU;

matching RSUs in the detection data according to features indicated by the parameter information related to the surface of the RSU obtained from the second V2X message, and determining that the detection data comprises the RSU under a condition of obtaining a matching result; and determining the second positioning information between the vehicle and the RSU under a condition that the detection data comprises the RSU, wherein under a condition that the second positioning information comprises the second angle information, the second angle information is determined as an included angle between a first direction and a second direction, wherein the first direction is an extension direction of a connecting line between the detection sensor and the RSU detected by the detection sensor, and the second direction is a running direction of the vehicle or a lane line direction; and the surface of the RSU is provided with a reflecting material, or the surface of each of the RSUs is a metasurface or a smart metasurface, and the parameter information comprises at least one of:

a supported signal type, a supported frequency band range, and a feature point shape.

13. The method according to claim 1, further comprising:

under a condition that at least one of the first positioning information is not obtained between two adjacent moments of determining the location of the vehicle or in a process of determining the location of the vehicle, predicting the location of the vehicle based on at least one of: real-time filtering of measurement data from an inertial measurement unit, real-time filtering of a vehicle driving parameter, wherein the vehicle driving parameter comprises at least one of a speed value, an acceleration value and an orientation angle value of the vehicle.

14. The method according to claim 1, further comprising:

under a condition that at least one of the first positioning information and at least one of the second positioning information are not obtained between two adjacent moments of determining the location of the vehicle or in a process of determining the location of the vehicle, predicting the location of the vehicle based on at least one of: real-time filtering of measurement data from an inertial measurement unit, real-time filtering of a vehicle driving parameter, wherein the vehicle driving parameter comprises at least one of a speed value, an acceleration value and an orientation angle value of the vehicle.

15. An on-board positioning system, comprising: a transceiver, a memory, a processor and a computer program stored in the memory and running on the processor, wherein the processor implements the vehicle-road cooperative positioning method according to claim 1 when executing the computer program.

* * * * *